US009245357B2

(12) United States Patent
Yamazaki et al.

(10) Patent No.: US 9,245,357 B2
(45) Date of Patent: Jan. 26, 2016

(54) IMAGE PROCESSING APPARATUS, IMAGE PROCESSING METHOD, AND STORAGE MEDIUM

(75) Inventors: Taeko Yamazaki, Kawasaki (JP); Yuji Kobayashi, Kawasaki (JP); Shigeo Fukuoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 13/567,519

(22) Filed: Aug. 6, 2012

(65) Prior Publication Data

US 2013/0039537 A1 Feb. 14, 2013

(30) Foreign Application Priority Data

Aug. 8, 2011 (JP) ................................ 2011-173023
Nov. 9, 2011 (JP) ................................ 2011-245794
Jul. 2, 2012 (JP) ................................ 2012-148457

(51) Int. Cl.
*G06K 9/18* (2006.01)
*G06K 9/46* (2006.01)
*G06K 9/66* (2006.01)
*G06T 11/00* (2006.01)
*G06K 9/00* (2006.01)

(52) U.S. Cl.
CPC ............ *G06T 11/00* (2013.01); *G06K 9/00791* (2013.01); *G06K 9/00818* (2013.01)

(58) Field of Classification Search
None
See application file for complete search history.

(56) References Cited

U.S. PATENT DOCUMENTS 6,885,768 B2 * 4/2005 Fujiwara ....................... 382/181
7,277,846 B2 * 10/2007 Satoh ................................ 704/3

(Continued)

FOREIGN PATENT DOCUMENTS

JP 05088653 A 4/1993
JP 05089280 A 4/1993

(Continued)

OTHER PUBLICATIONS

Picone et al., "Kanji-to-Hiragana Conversion Based on a Length-Constrained N-Gram Analysis", IEEE Transactions on Speech and Audio Processing, vol. 7 No. 6, Nov. 1999, pp. 685-696.*

(Continued)

*Primary Examiner* — Matthew Bella
*Assistant Examiner* — Jose M Torres
(74) *Attorney, Agent, or Firm* — Canon U.S.A., Inc. IP Division

(57) ABSTRACT

An image processing apparatus includes a character recognition unit configured to perform character recognition of a character region where characters exist in an image to generate character code, a detection unit configured to detect a region of the image where a feature change in the image is small, and a placement unit configured to place data obtained from the character code in the detected region.

24 Claims, 21 Drawing Sheets

(56) References Cited

U.S. PATENT DOCUMENTS

| | | | | |
|---|---|---|---|---|
| 7,352,912 | B2 * | 4/2008 | Eschbach | 382/264 |
| 8,290,312 | B2 * | 10/2012 | Ohguro | 382/309 |
| 2003/0202683 | A1 * | 10/2003 | Ma et al. | 382/104 |
| 2006/0204111 | A1 * | 9/2006 | Koshi et al. | 382/229 |
| 2008/0233980 | A1 * | 9/2008 | Englund et al. | 455/466 |
| 2009/0055159 | A1 * | 2/2009 | Kato | 704/3 |
| 2009/0285445 | A1 * | 11/2009 | Vasa | G01C 21/26 382/100 |
| 2010/0156919 | A1 * | 6/2010 | Bala et al. | 345/582 |
| 2013/0004068 | A1 * | 1/2013 | Koo et al. | 382/165 |

FOREIGN PATENT DOCUMENTS

| | | | |
|---|---|---|---|
| JP | 05108716 | A | 4/1993 |
| JP | 07-013969 | A | 1/1995 |
| JP | 07192000 | A | 7/1995 |
| JP | 09-138802 | A | 5/1997 |
| JP | 2001-319240 | A | 11/2001 |
| JP | 2007018448 | A | 1/2007 |
| JP | 2009-123206 | A | 6/2009 |
| JP | 2009-151759 | A | 7/2009 |

OTHER PUBLICATIONS

Haritaoglu, "Scene Text Extraction and Translation for Handheld Devices", Proceedings of the 2001 IEEE Computer Society Conference on Computer Vision and Pattern Recognition, vol. 2, 2001, pp. II-408-II-413.*

Yang et al., "An Automatic Sign Recognition and Translation System", Workshop on Perceptive User Interfaces (PUI 2001), Nov. 2001, pp. 1-8.*

Yang et al., "Towards Automatic Sign Translation", Proceedings of the First International Conference on Human Language Technology Research, 2006, pp. 1-6.*

* cited by examiner

EXTEND NORMAL VECTORS FROM FOUR SIDES OF CHARACTER PLACEMENT REGION

EXTEND LINE SEGMENTS FROM MIDDLE POINTS OF FOUR SIDES OF CHARACTER PLACEMENT REGION

EXTEND RADIAL LINES FROM CENTER OF CHARACTER PLACEMENT REGION

FIG.17

| CHARACTER COLOR | COLOR OF PLACEMENT REGION | WARNING LEVEL |
|---|---|---|
| BLACK | WHITE | 1 |
| BLUE | WHITE | 2 |
| RED | WHITE | 3 |
| WHITE | BLUE | 2 |
| WHITE | RED | 3 |
| BLACK | YELLOW | 3 |
| BLACK | ORANGE | 3 |

FIG.20A

JAPANESE CHARACTERS

| | WARNING LEVEL | SIGN | DESIGNATED TERM |
|---|---|---|---|
| 2001 | PROHIBITION |  | 立入禁止　立ち入り禁止<br>入るな　入ってはいけません<br>Staff only |
| 2002 | PROHIBITION |  | 禁煙　No Smoking |
| 2003 | PROHIBITION |  | 撮影禁止<br>Do not take photographs |

FIG.20B

JAPANESE CHARACTERS

| | WARNING LEVEL | SIGN | DESIGNATED TERM |
|---|---|---|---|
| 2004 | CAUTION |  | 頭上注意　上方注意<br>落下物注意<br>Watch your head |
| 2005 | CAUTION |  | 足元注意　足下注意<br>段差注意<br>Watch your step |
| 2006 | GENERAL INFORMATION | 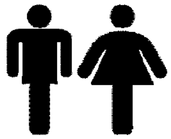 | トイレ　手洗い　化粧室<br>便所　厠<br>Toilet Restroom Wash room |
| 2007 | GENERAL INFORMATION |  | NAMES OF PLACES IN GEOGRAPHICAL NAME DATABASE |

IMAGE PROCESSING APPARATUS, IMAGE PROCESSING METHOD, AND STORAGE MEDIUM

BACKGROUND OF THE INVENTION

1. Field of the Invention

The present invention relates to a technique useful for processing character information extracted from an image and displaying the extracted character information with enhanced visibility.

2. Description of the Related Art

In recent years, digital cameras have been used not only for capturing images but also for recording character information in images. Further, in order to utilize the captured images, many users extract character information from the images and convert the character information into a style that can be easily accessed according to, for example, translation.

Japanese Patent Application Laid-Open No. 09-138802 discusses a technique that acquires image data of characters written on, for example, tourist information boards, walls of buildings, signboards, brochures, and restaurant menus, using a camera, subject the acquired image data to character recognition, and translate the characters. If the character information after the translation is reflected to (embedded in) the original document, the number of characters of the message after the translation may increase/decrease from the original message. Japanese Patent Application Laid-Open No. 07-013969, discusses a technique useful for changing the character size of a translated text so that it can be appropriately embedded in the original position of the text.

However, according to the technique discussed in Japanese Patent Application Laid-Open No. 09-138802, the character information after translation, which is presented to the user, is displayed in a translation display area different from the region where the characters of the translation target have been displayed in the original image. In other words, the character information is not displayed at the original position in the original image. Since the position of the character information is changed, it is not easy to understand the original position of the character information in the original image. However, if the character information after translation is simply placed at the position where the characters of the translation target existed in the original image, the character information after translation may not fit in the original region and run off the area (see FIG. 3E).

According to the technique discussed in Japanese Patent Application Laid-Open No. 07-013969, in displaying character information after translation, the character size of the translated document is adjusted to fit the document area where the translation target characters existed. However, if the area of the region where the character information after translation is to be placed is small, the character size after translation may be too small to read (FIG. 3D). Further, the visibility is poor when the character information is converted into an easy-to-understand style.

Japanese Patent Application Laid-Open No. 2001-319240 discusses a technique for dealing with a document image. In the case of a natural image, which has no unused regions, a region excellent in visibility cannot be determined by placing a pattern obtained from character code generated by character recognition, as discussed in Japanese Patent Application Laid-Open No. 2001-319240.

SUMMARY OF THE INVENTION

According to an aspect of the present invention, an image processing apparatus includes a character recognition unit configured to perform character recognition of a character region where characters exist in an image to generate character code, a detection unit configured to detect a region of the image where a feature change in the image is small, and a placement unit configured to place data obtained from the character code in the detected region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 17 illustrates an example of a warning level concerning color combination.

FIGS. 20A and 20B illustrate examples of a sign table according to eighth and ninth exemplary embodiments.

DESCRIPTION OF THE EMBODIMENTS

Various exemplary embodiments, features, and aspects of the invention will be described in detail below with reference to the drawings.

Figure 1:
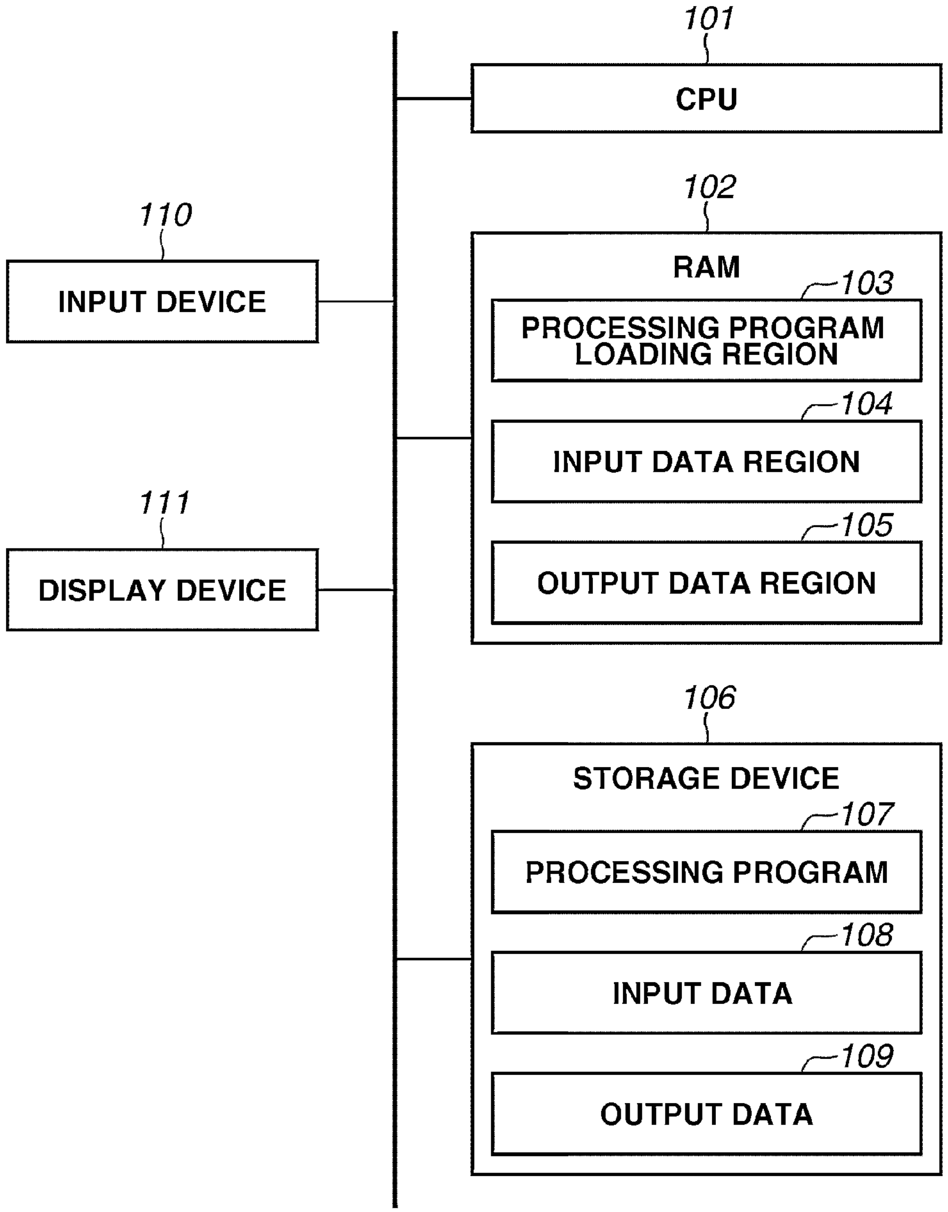
FIG. 1 illustrates a configuration example of an image processing apparatus according to a first exemplary embodiment of the present invention.

FIG. 1 illustrates a configuration example of an image processing apparatus according to a first exemplary embodiment of the present invention. A central processing unit (CPU) 101 executes an execution program. Further, the CPU 101 controls devices each of which is connected to a bus. A random access memory (RAM) 102 is where a processing program and input/output data are loaded into and processed. A storage device 106 stores image data to be processed and processing-finished electronic files. An input device 110 is used when data to be processed is input from an external device. A display device 111 is used for externally displaying processed data.

Image data input from the input device 110 of, for example, a digital camera or a smartphone is stored in the storage device 106 such as a hard disk. The image data is input as input data 108. A processing program 107 stored in the storage device 106 is loaded into a processing program loading region 103 of the RAM 102 and executed by the CPU 101.

According to the processing program, the input data 108 is read out from the storage device 106 and loaded into an input data region 104 of the RAM 102. The processing program processes the input data 108 that has been loaded and outputs the result of the processing to an output data region 105 of the RAM 102. The processed data is stored in the storage device 106 as output data 109. The output data 109 is output to a display device such as the display device 111.

Each of the CPU 101, the RAM 102, and the storage device 106 can be a built-in device of the input device 110, but can also exist as an external device of the input device 110. Further, the display device 111 can be supplied with the input device 110. For example, if the input device 110 is an input device of a digital camera, a liquid crystal screen of the main body will be the display device 111.

When the CPU 101 executes programs, it functions as various units. A control circuit such as an application-specific integrated circuit (ASIC) which operates with the CPU 101 can function as such units. Further, the various units can be realized according to coordination between the CPU 101 and a control circuit that controls the operation of the image processing apparatus. The CPU 101 is not necessarily a single device and can be realized by a plurality of devices. If the CPU 101 is not a single device, a plurality of CPUs can execute processing in a distributed manner. Further, the plurality of CPUs can be set in a single computer or set in a plurality of computers that are physically different. The units, which are realized by the execution of a program by the CPU, can be also realized by a dedicated circuit.

Figure 2:
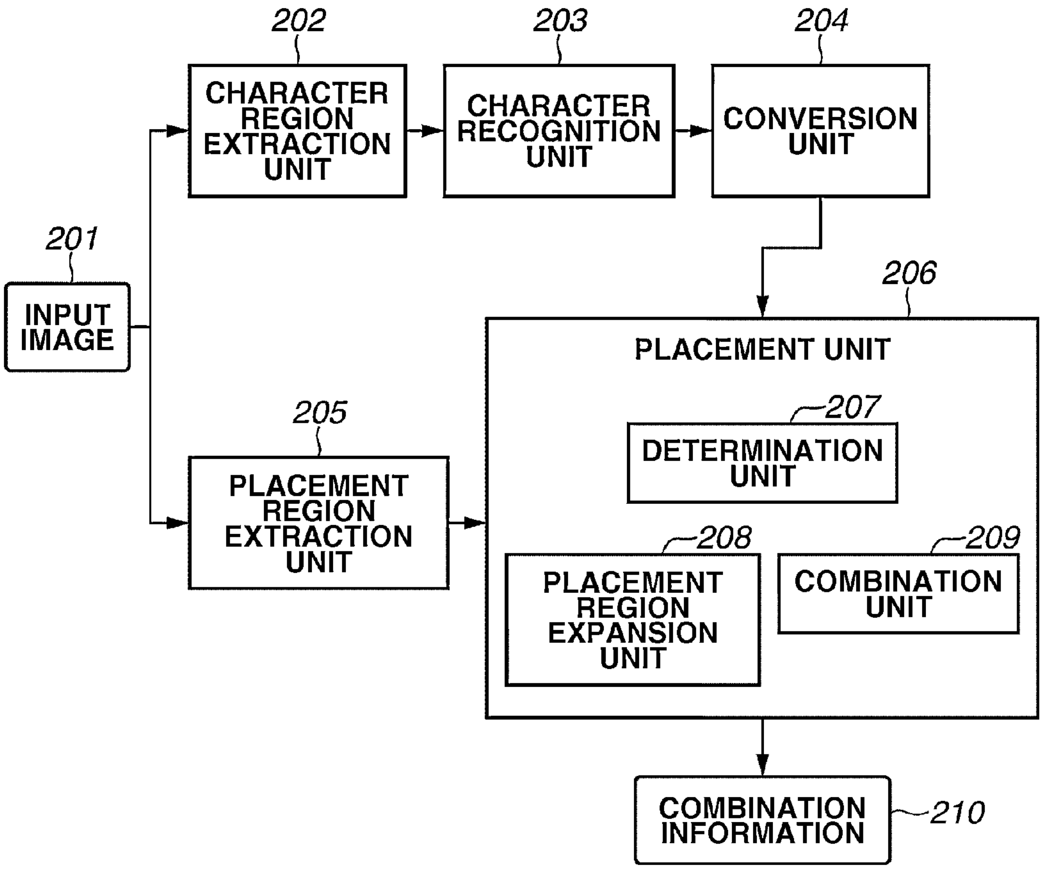
FIG. 2 is a function block diagram of the image processing apparatus according to the first exemplary embodiment.

FIG. 2 is a function block diagram of the image processing apparatus according to the first exemplary embodiment. According to the first exemplary embodiment, each function is described in detail after a brief description of each function block. An input image 201 is input from the input device 110.

Figure 3A:
FIG. 3A illustrates an example of an input image.

An example of the input image 201 is illustrated in FIG. 3A. An image 301 in FIG. 3A is an image of a traffic sign on a street.

The input image can be either a still image or a moving image previously stored in the storage device 106. Further, the input image can be a moving image acquired in real time and sequentially processed by the input device 110. According to the present exemplary embodiment, the image 301 as a still image is used in describing the details of the subsequent processing.

Figure 3D:
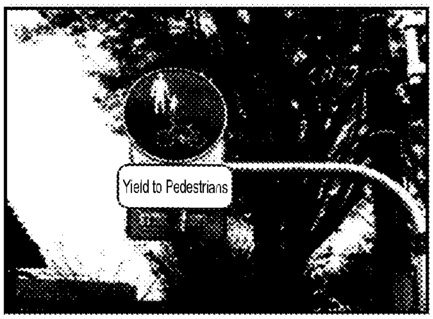
FIGS. 3D, 3E, and 3F illustrate examples of combination information.
Figure 3B:
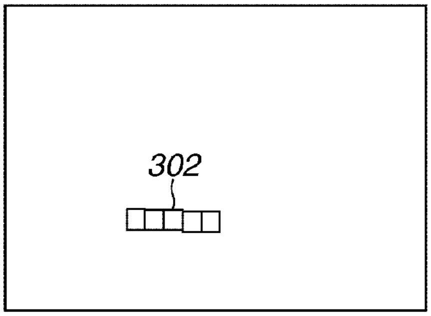
FIG. 3B illustrates an example of a character region.

A character region extraction unit 202 extracts a region where the characters exist from the input image 201. The region is, for example, a character region in a signboard. A known technique can be used in the extraction. For example, a technique discussed in Japanese Patent Application Laid-Open No. 2009-123206 can be used. According to Japanese Patent Application Laid-Open No. 2009-123206, a character region is extracted by using an edge image generated from an input image. Then, a connected pixel blob (Connected Component, hereinafter referred to as CC) is generated from the edge image. When positional coordinates of the CC, which is assumed as a part of a character from the feature quantity (such as the size of the CC) is subjected to Hough transform, a candidate CC group on a straight line is obtained. This CC group is determined as the character region. A region 302 in FIG. 3B illustrates a character region extracted from the image 301.

A character recognition unit 203 performs character recognition of the character region extracted by the character region extraction unit 202 and converts the recognized characters into character code. A publicly known character recognition technique can be used in the recognition. According to the present exemplary embodiment, information concerning the characters obtained from the character recognition processing, in other words, character code is generated. Together with the character code, information of the character region obtained from the recognition processing, for example, coordinates information of a circumscribed rectangle of the character region as well as character color can be output as the character information.

The present exemplary embodiment is based on a case where character code corresponding to "Yield to Pedestrians" is obtained from the character region 302. The characters included in the character region may have a missing portion (i.e., partial character). However, character code can also be obtained from a partial character if it is recognized.

A conversion unit 204 converts the character code generated by a character recognition unit 203 into different character code. For example, the conversion unit 204 converts the character code when a word is translated into a word of different language, when a kanji character is changed to hiragana character, and when a term is changed into a plain term with similar meaning.

When such conversion is performed, the area necessary in placing the text pattern obtained from the character code before conversion may not be equal to the area necessary in placing the text pattern obtained from the character code after conversion. For example, if a phrase "歩行者優先" in Japanese is translated into English, it is "Yield to Pedestrians". The character string in English is longer than the original, and a more area is necessary in placing the characters. Further, if the phrase "歩行者優先" in Japanese is rewritten in hiragana, it will be "ほこうしゃ ゆうせん". If the phrase "歩行者優先" is rewritten in simple terms, it will be "あるくひとがさきです".

According to the change in the number of characters or the change in character width, the area necessary in placing the text pattern is changed. In other words, the length of the character string is changed.

Further, the area necessary in placing the text pattern obtained from the character code that has been generated according to recognition of a partial character will be greater than the area of the region of the partial character in the original image. This is because, by generating character code from a partial character, the partial character is converted into character code of a complete character. Thus, a text pattern obtained from the character code generated by the character recognition unit 203 may also require a more area than the original area even if it is not obtained by conversion of the character code to different character code.

Further, if a character size recognized by the character recognition unit 203 is smaller than a lower limit of a character size of good visibility, the text pattern obtained from the character code that has been generated by the character recognition may be placed so that the character size is greater than the lower limit. If the character size is increased, the area necessary in placing the text pattern of the character code that has been generated according to the character recognition will be larger than the area of the original character region in the image.

The present exemplary embodiment is described based on a case where "歩行者優先" in Japanese is translated into "Yield to Pedestrians" in English.

A placement region extraction unit 205 extracts a character placement region from the input image 201. The placement region is a background portion of the characters. In the image 301, the placement region is the main body of the signboard. A frame portion of a bulletin board with characters, brochure, menu of a restaurant, or a sign corresponds to the placement region.

A publicly known technique used for recognizing license plates can be used for the extraction of the placement region. A region extracted by the technique can be considered as the placement region. For example, Japanese Patent Application Laid-Open No. 2009-151759 discusses a method that obtains a region of a license plate main body by generating an edge image from an input image. When an edge image is generated, a pixel whose edge strength is equal to or higher than a predetermined value is extracted. Then, the position of the pixel that has been extracted is subjected to Hough transform. A region enclosed by line segments obtained from the transformation is considered as the region of the license plate main body. The numbers on the license plate correspond to the characters, and the plate corresponds to the signboard as the background portion of the characters.

Figure 3E:
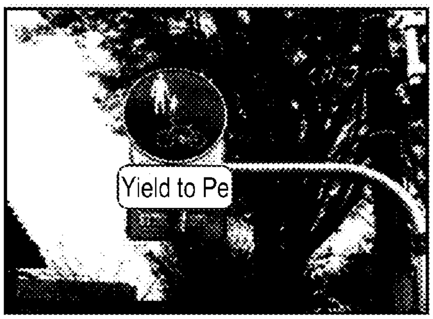
Figure 3C:
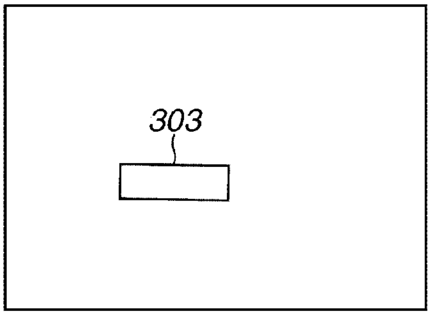
FIG. 3C illustrates an example of a placement region.

A region 303 in FIG. 3C indicates the placement region extracted from the image 301.

A placement unit 206 places the character information converted by the conversion unit 204 in a region including the placement region extracted by the placement region extraction unit 205. The placement unit 206 includes a determination unit 207, a placement region expansion unit 208, and a combination unit 209.

A case where the number of characters varies between the code generated by the character recognition unit 203 from the input image 201 and the code obtained from the conversion by the conversion unit 204 will be described.

If the image 301 is input, the character code data recognized by the character recognition unit 203 will be "歩行者優先" (five characters).

However, if "歩行者優先" is converted into English by the conversion unit 204, "Yield to Pedestrians" (20 letters including spaces) will be obtained. This is four times the number before conversion. Thus, if the character information (text pattern) after conversion is placed in the region of the main body of the signboard without changing the original size, the character information (text pattern) runs off the area of the signboard (see FIG. 3E). Further, if the character information (text pattern) after conversion is placed so that it fits in the placement region, the size of the characters is greatly reduced. Accordingly, readability is reduced (see FIG. 3D).

In addition to the difference in the number of characters, the difference in the character width of one character affects the placement area of the character information after conversion.

In order to solve these problems, the placement unit 206 is provided with the functionality of the determination unit 207 and the placement region expansion unit 208. The determination unit 207 determines whether the readability is ensured when the text pattern obtained from the converted character code is placed in the placement region. The placement region expansion unit 208 expands the placement region. Detailed functions of the determination unit 207 and the placement region expansion unit 208 will be described below.

Combination information 210 is obtained by the placement unit 206 and is a combination of the input image 201 and character information (text pattern) after conversion.

Figure 3F:

FIG. 3F illustrates combination information of the image 301 and the character information "Yield to Pedestrians" obtained by the conversion performed by the conversion unit 204. By the placement unit 206, the placement region of the signboard portion is extended in the direction that does not affect other objects, and the character information (text pattern) after conversion fits in the expanded placement region.

According to the present exemplary embodiment, since the input image is described as a still image, the combination information is also a still image and is superposed on a still image. However, if the input image is a moving image, combination information acquired for each frame can be superposed on each frame. In this case, the user views the combination information as if it is a moving image. Further, combination information of a representative frame of the moving image frames may be continuously generated and displayed. In such a case, if the input image is a moving image acquired in real time, combination information of the input image can be generated by using augmented reality.

Next, the placement unit 206 will be described in detail.

Figure 4:
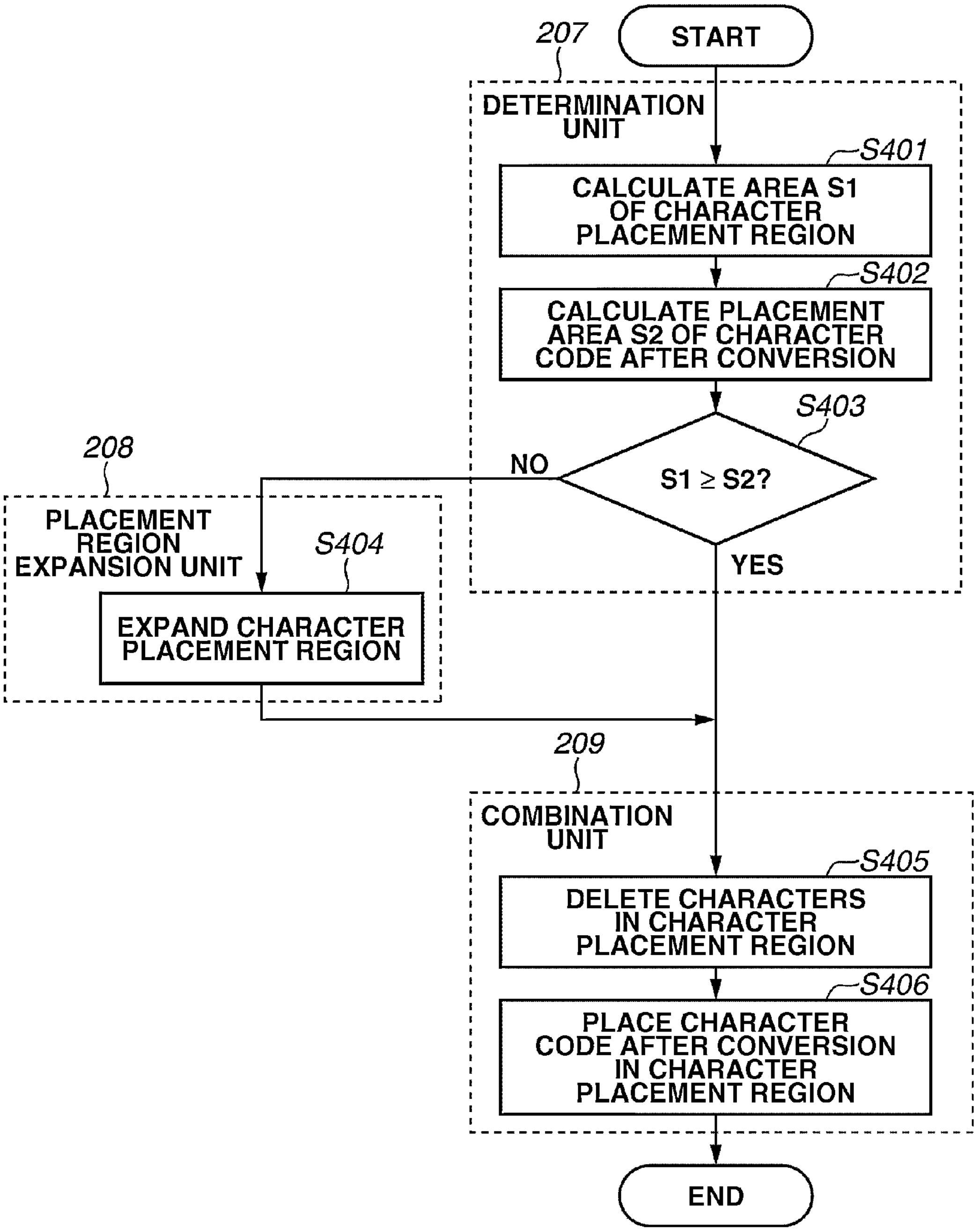
FIG. 4 is a flowchart illustrating processing procedures of a placement unit according to the first exemplary embodiment.

FIG. 4 is a flowchart illustrating processing procedures of the placement unit 206. This flowchart is realized by the CPU 101 executing a control program. Steps S401, S402, and S403 are performed by the determination unit 207, step S404 is performed by the placement region expansion unit 208, and steps S405 and S406 are performed by the combination unit 209.

In step S401, the determination unit 207 acquires an area S1 of the placement region extracted by the placement region extraction unit 205. In step S402, the determination unit 207 acquires a placement area S2 of the text pattern obtained from the character code after conversion by the conversion unit 204.

The placement area S2 is obtained by multiplying the character size of the original image and the number of characters of the character code after conversion. Further, if a character size after conversion is set in advance, the placement area S2 can be obtained by multiplying the character size that has been set and the number of characters of the character code. Further, the length of the character string can be acquired by multiplying the character width and the number of characters.

In step S403, the determination unit 207 compares the area S1 and the placement area S2 and determines whether the text pattern obtained from the character code after conversion fits in the original placement region. If the placement area S2 is equal to or smaller than the area S1 (S1≥S2) (YES in step S403), since the text pattern obtained from the character code after conversion fits in the placement region with a character size that does not reduce the level of visual recognition, the determination unit 207 determines that the text pattern is arrangeable, and the processing proceeds to step S405.

If the placement area S2 is larger than the area S1 (S1<S2) (NO in step S403), the determination unit 207 determines that readability will be reduced if the text pattern obtained after conversion of the character code is placed in the original placement region, and thus not arrangeable. Then, the processing proceeds to step S404.

In step S404, the placement region expansion unit 208 determines whether a region that can be used for the placement of the characters is on the periphery of the placement region and expands the placement region if such a region exists. If the placement region is simply expanded, it may extend over other objects in the image. Thus, a region that does not affect other objects even if the placement region is expanded, in other words, a region on the periphery of the placement region and that does not include other objects is searched. The presence/absence of the objects is determined, for example, by a color change or the presence/absence of a strong edge component. Details of this processing will be described below.

In step S405, the combination unit 209 deletes the original characters that exist in the placement region as preparation for the placement of the text pattern obtained from the character code after conversion. More specifically, the combination unit 209 calculates an average of the color information of the placement region excluding the character region, and paints the character region with that color. As a different method, the whole placement region after expansion is painted with an average color of the placement region before expansion excluding the character region.

In step S406, the combination unit 209 places the text pattern obtained from the character code after conversion in the placement region. The character size used in this step is the size used in the calculation of the placement area in step S402. The color used in this step is the original color acquired together with the character code by the character recognition unit 203.

Figure 5:
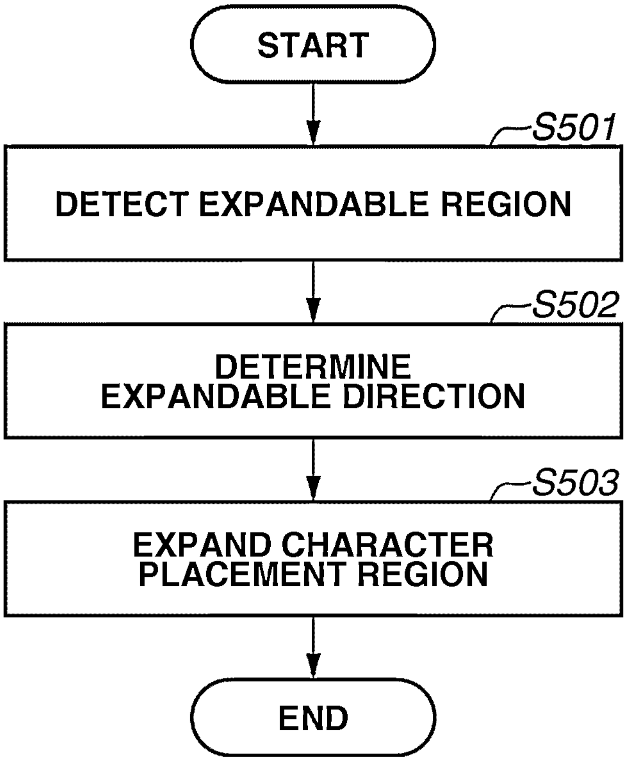
FIG. 5 is a flowchart illustrating processing procedures of a placement region expansion unit according to the first exemplary embodiment.
Figure 6:
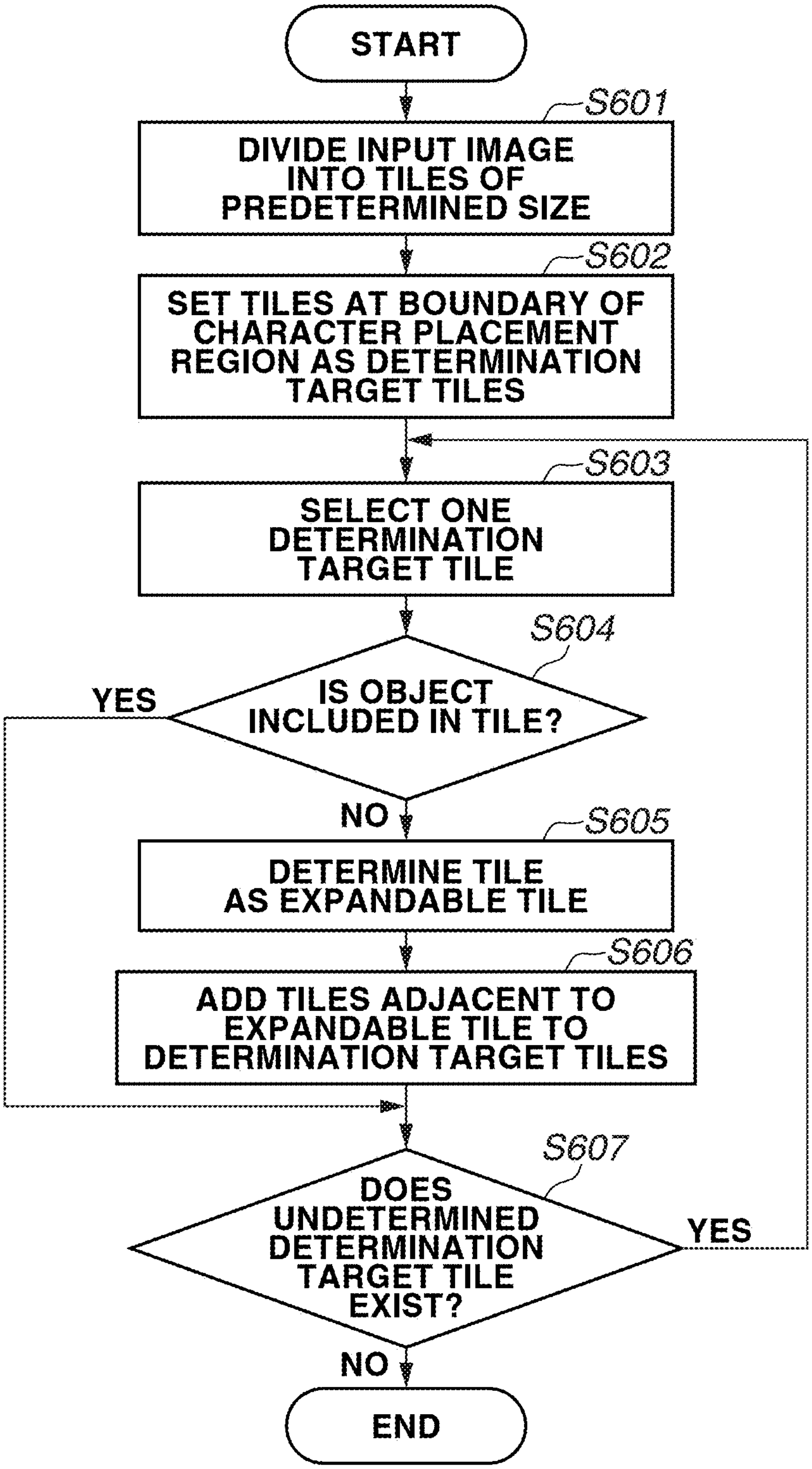
FIG. 6 is a flowchart illustrating detailed processing procedures of step S501.

FIGS. 5 and 6 are flowcharts illustrating the processing of the placement region expansion unit 208 in step S404 in FIG. 4. FIG. 5 illustrates an outline and FIG. 6 illustrates the details of the processing. The flowcharts are realized by the CPU 101 executing a control program.

In step S501, the placement region expansion unit 208 detects a region that does not include other objects and thus considered as not affecting the original image even if the characters are placed. In other words, the placement region expansion unit 208 detects a region with small color change and not including many strong edge components. Then, the processing proceeds to step S502. Details of the processing in step S501 will be described below with reference to FIG. 6.

In step S502, the placement region expansion unit 208 determines the direction in which the placement region is to be expanded, and the processing proceeds to step S503.

In step S503, the placement region expansion unit 208 expands the placement region so that it satisfies the area necessary for the placement of the text pattern obtained from the character code after conversion, and paints the expanded placement region with the average color of the original placement region. The placement region can be expanded while maintaining the shape (distorted shape such as a trapezoid) in the captured image. The placement region can also be replaced with a simple rectangle (circumscribed rectangle) and expanded.

Next, processing procedures of the expandable region detection in step S501 will be described with reference to a flowchart in FIG. 6. In detecting an expandable region, the image is divided into tiles of a predetermined size. Then, whether the tiles include an object is determined. A region not including an object is a region with little change in color and not including many strong edge components.

FIG. 6 is a flowchart illustrating details of the expandable region detection procedure in step S501. This flowchart is realized by the CPU 101 executing a control program. In step S601, the placement region expansion unit 208 divides the input image into tiles of a predetermined size, and the processing proceeds to step S602. According to the present exemplary embodiment, although the predetermined tile size is 32×32 pixels, tiles of an arbitrary size can be used.

In step S602, the placement region expansion unit 208 sets the tiles at the boundary of the character placement region as the target tiles used for determining whether the placement region is expandable, and the processing proceeds to step S603. If a plurality of placement regions exists in the same image, step S602 is useful since only the tiles at the boundary of the placement regions, as the targets of the expansion processing, will be used in the detection. Compared to a case where an expandable region with small color change or not including many strong edge components is detected from the whole image region, the processing load is reduced since the target region is reduced.

Figure 7A:
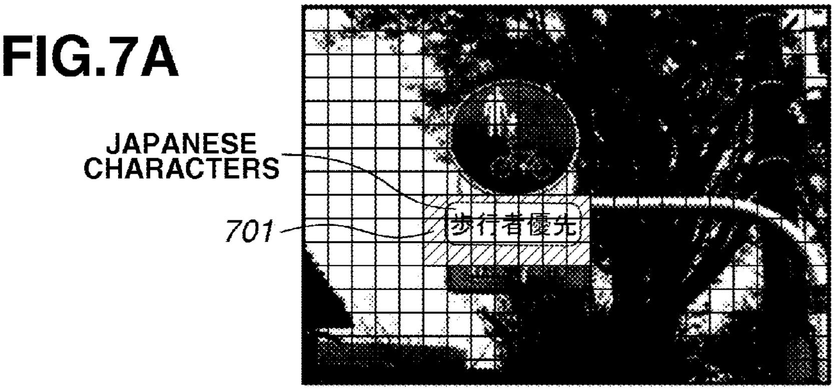
FIGS. 7A, 7B, and 7C illustrate an example of an image subjected to processing in step S404.

In FIG. 7A, tiles 701 with hatching are determined as the determination target tiles in step S602.

In step S603, the placement region expansion unit 208 selects one tile from the determination target tiles, and the processing proceeds to step S604. The tile to be processed in the subsequent processing is this tile selected from the determination target tiles.

In step S604, the placement region expansion unit 208 determines whether an object is included in the tile to be processed. If any object is not included (NO in step S604), the processing proceeds to step S605. If an object is included (YES in step S604), the processing proceeds to step S607. Before the determination, if the tile to be processed is at the boundary of the placement region, the placement region expansion unit 208 determines whether an object is included after excluding the pixels of the placement region from the tile to be processed.

The presence/absence of an object can be determined according to the methods below.

- Generate a color histogram based on the color information of the tile. If the dispersion of the histogram is low, it is considered that an object is not included in the tile.
- Acquire the color of the tile from the color information of the tile using a general color clustering method. If a unique color is acquired, it is considered that any object is not included in the tile.
- Generate an edge image. If a strong edge component is not included in the tile, it is considered that any object is not included in the tile.
- The sky portion of a scenic image is regarded as not including an object. If the color information of the tile is mostly blue, it is considered that any object is not included in the tile.
- The leaves and trees of a scenic image do not affect the placement even if they are covered by the placement region. If the color information of the tile is mostly green, it is considered that any object is not included in the tile.

The presence/absence of an object is determined by any or a combination of the above-described methods.

In step S605, the placement region expansion unit 208 determines that the tile determined as not including an object in step S604 is an expandable tile.

In step S606, the placement region expansion unit 208 adds the tiles surrounding the expandable tile to the determination target tiles. More specifically, among the eight or four tiles surrounding the expandable tile, the tiles other than those that have already undergone the determination processing and the tiles already determined as the determination target tiles are added to the determination target tiles.

In step S607, the placement region expansion unit 208 determines whether an undetermined tile is included in the determination target tiles. If an undetermined tile exists (YES in step S607), the processing returns to step S603. If the determination of all the determination target tiles is finished (NO in step S607), the expandable region detection processing ends, and the processing proceeds to the expansion direction determination processing in step S502.

Figure 7B:
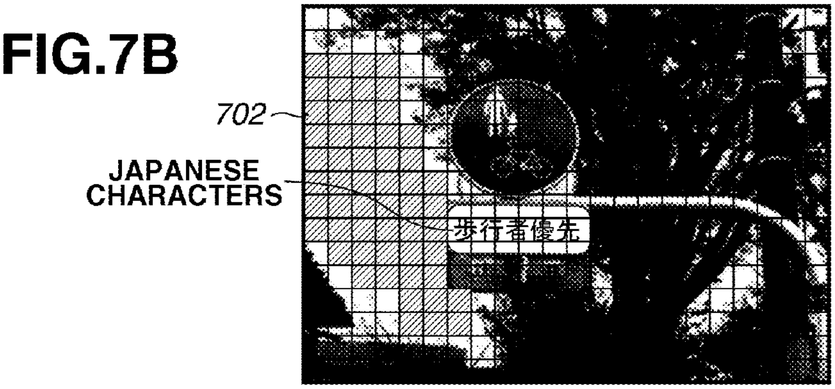

In FIG. 7B, tiles 702 with narrow hatching are determined as the expandable tiles.

In step S502, the placement region expansion unit 208 determines the direction in which the placement region is to be expanded from the distribution of the expandable tiles. The method for determining the direction is described below.

Figure 7C:
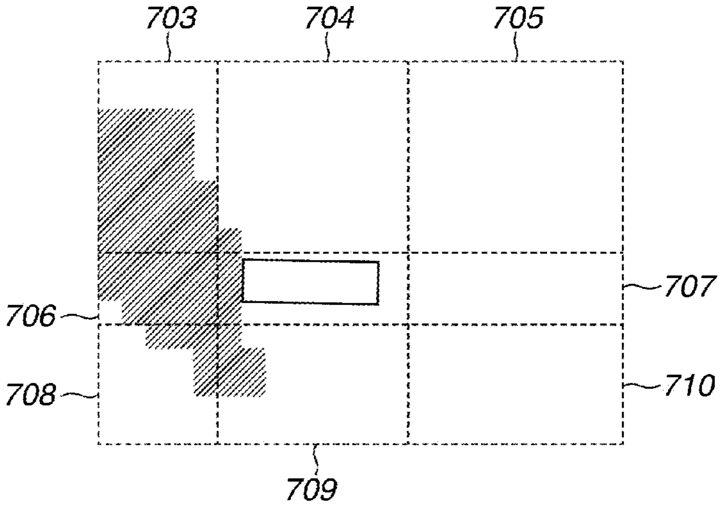

The region surrounding the placement region is divided into nine sections as illustrated in FIG. 7C. Then, the ratio of the expandable tiles is calculated for each section (for example, 703-710). Among the sections having high ratios of expandable tiles, the section in the directions of the normal vectors of the sides of the placement region is selected in precedence to others. The direction from the placement region to the selected section is determined as the expandable direction. In FIG. 7C, since the section in the direction of the normal vectors of the sides of the placement region and having the highest ratio of expandable tiles is a section 706, the left side of the character placement region is determined as the expandable direction.

After the determination of the expandable direction according to the above-described processing, the character placement region is expanded in step S503. FIG. 3F illustrates an example of the placement of the text pattern obtained from the character code after conversion. As can be seen, the text pattern does not interfere with other objects in the image, and the character information after conversion is combined in a state of good visibility.

As described above, according to the present exemplary embodiment, with respect to the combination of the original image and the text pattern obtained from the character code generated by the recognition of the characters in the image, even if the text pattern which is obtained from the character code does not fit in the original placement region, by expanding the placement region before placing the text pattern obtained from the character code, the text pattern obtained from the character code can be displayed with enhanced visibility in combination with the original image.

According to the first exemplary embodiment, the determination unit 207 determines whether the character placement region can be expanded by comparing the area S1 and the placement area S2. The placement area S2 is the area that is necessary when the character size of the characters in the text pattern is the same as the original character size or is a predetermined character size. However, even if the character size is slightly smaller than the original character size, if readability is ensured, the characters can be placed in the placement region. Thus, according to the present exemplary embodiment, the expansion of the character placement region is determined based on whether the text pattern obtained from the character code and including characters of a size equal to or greater than a lower limit character size that can ensure readability can be placed.

Figure 8:
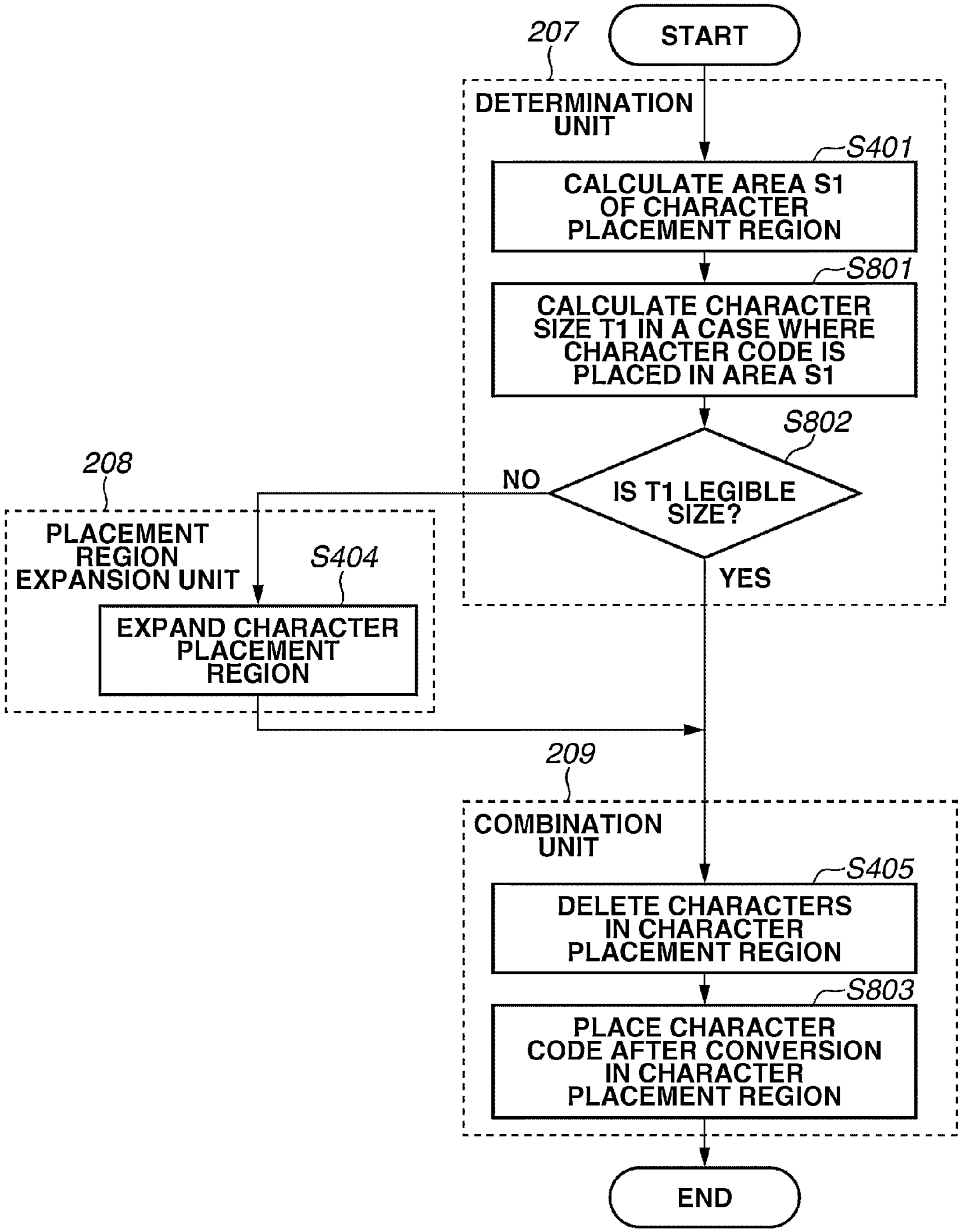
FIG. 8 is a flowchart illustrating processing procedures of the placement unit according to a second exemplary embodiment.

Processing procedures of the placement unit 206 according to a second exemplary embodiment will be described with reference to a flowchart in FIG. 8. This flowchart is realized by the CPU 101 executing a control program. Descriptions of the processing in steps denoted by the same step numbers in FIG. 4 described according to the first exemplary embodiment are not repeated.

In step S801, the determination unit 207 calculates a character size T1. The character size T1 is a size of the character that is used in a case where the text pattern obtained from the character code after conversion is placed in the area S1 of the placement region calculated in step S401.

In step S802, the determination unit 207 compares the character size T1 and the smallest character size that can ensure readability set in advance. If the character size T1 is larger (YES in step S802), it is determined that the text pattern obtained from the character code after conversion fits in the placement region with enhanced visibility, and the processing proceeds to step S405. If the character size T1 calculated in step S801 is larger than the lower limit character size, expansion of the character placement region is not necessary. If the character size T1 calculated in step S801 is not larger than the lower limit character size which can ensure readability of the character size T1, it is determined that the text pattern does not fit in the placement region with enhanced visibility (NO in step S802), and the processing proceeds to step S404.

In step S803, the combination unit 209 places the text pattern obtained from the character code after conversion in the placement region. The character size is selected from the character size T1 that is larger than the lower limit character size, the lower limit character size, the original character size that is greater than the lower limit character size, and the character size determined in advance. The color of the characters acquired together with the character code by the character recognition unit 203 is used as the character color.

As described above, according to the present exemplary embodiment, whether to expand the placement region is determined based on whether the text pattern including characters equal to or greater than a lower limit size and can ensure readability can be placed in the placement region.

According to the placement region expansion unit 208 in the first exemplary embodiment, the expandable direction is determined to be one direction and the placement region is expanded in the determined direction. However, according to a third exemplary embodiment, the placement region can be expanded in two or more directions.

For example, even if the placement region is expanded in the direction of the section whose ratio of the expandable tiles is the highest, if the placement region is not large enough to place the text pattern obtained from the character code after conversion, the placement region is expanded in the direction of the section whose ratio of the expandable tiles is the next highest.

Figure 9A:
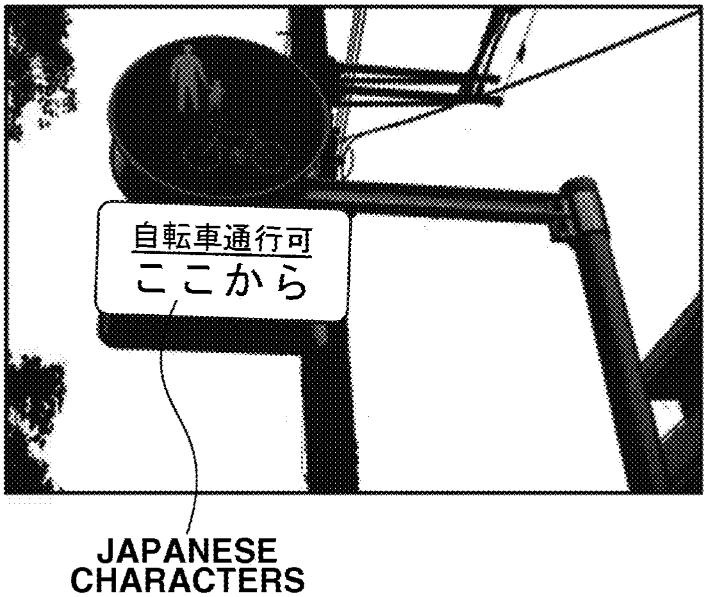
FIGS. 9A and 9B illustrate examples of combination information according to a third exemplary embodiment.
Figure 9B:
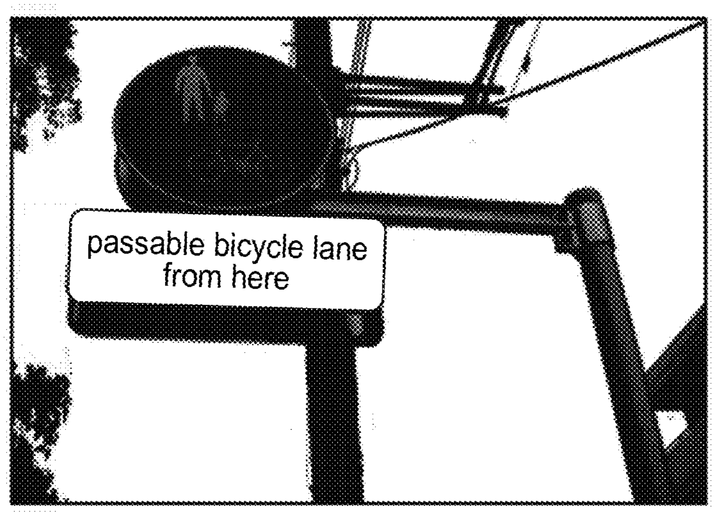

FIGS. 9A and 9B illustrate examples of the placement region expanded in the left direction according to the determination that the left direction is the expandable direction, but further expanded in the right direction since the placement area of the placement region for the text pattern obtained from the character code after conversion has not been ensured. The right direction is the direction having the next highest ratio of the expandable tiles. Further, the placement region can be expanded from the center in a plurality of directions if the ratio of the expandable tiles is equal to or more than a predetermined value.

According to the first exemplary embodiment, the placement region expansion unit 208 determines whether an expandable region exists on the periphery of the placement region in tile units, and further determines the direction appropriate for expansion from the distribution of the expandable tiles. According to a fourth exemplary embodiment, the expandable direction can be determined in a simple manner.

Figure 10:
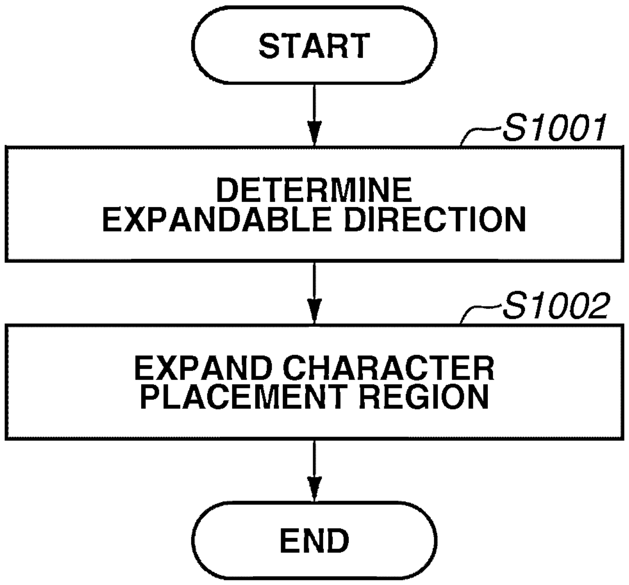
FIG. 10 is a flowchart illustrating processing procedure of the placement region expansion unit according to a fourth exemplary embodiment.

FIG. 10 is a flowchart illustrating processing procedures of the placement region expansion unit 208. This flowchart is realized by the CPU 101 executing a control program.

In step S1001, the placement region expansion unit 208 detects a direction that does not include other objects and thus characters can be placed if the placement region is expanded in that direction. Then, the processing proceeds to step S1002. Details of the processing procedure in step S1001 will be described below with reference to a flowchart illustrated in FIG. 11.

In step S1002, the placement region expansion unit 208 expands the placement region so that it satisfies the area necessary in placing the text pattern obtained from the character code after conversion and paints the expanded placement region using the average color of the original placement region.

Figure 11:
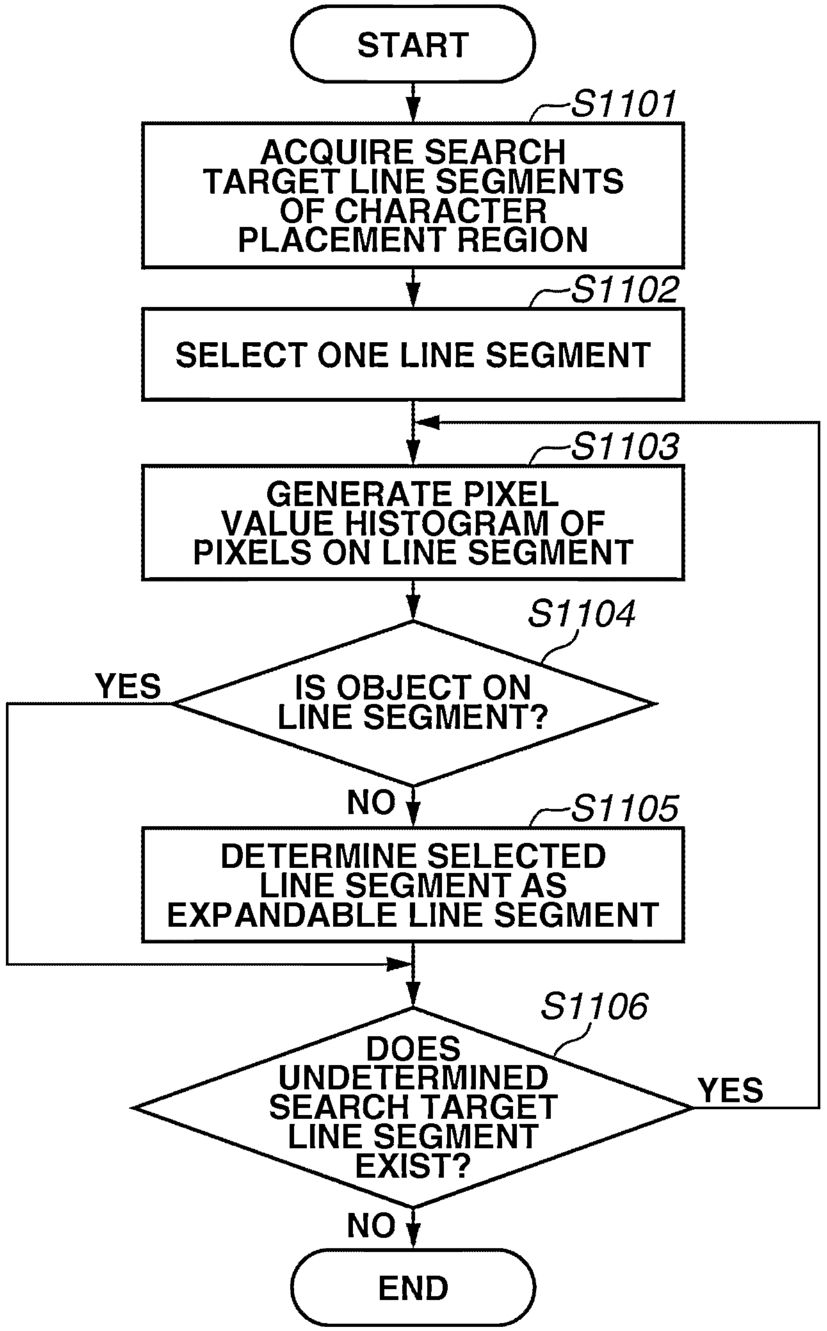
FIG. 11 is a flowchart illustrating detailed processing procedures of step S1001.

FIG. 11 is a flowchart illustrating the details of the expandable direction determination processing in step S1001. This flowchart is realized by the CPU 101 executing a control program.

In step S1101, the placement region expansion unit 208 acquires search target line segments and the processing proceeds to step S1102.

Figure 12A:
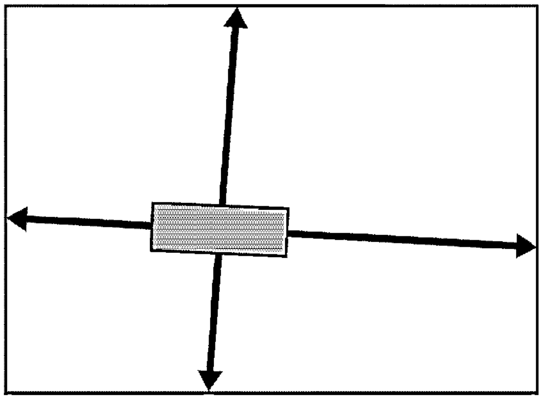
FIGS. 12A, 12B, and 12C illustrate examples of a search target line segment according to the fourth exemplary embodiment.
Figure 12B:
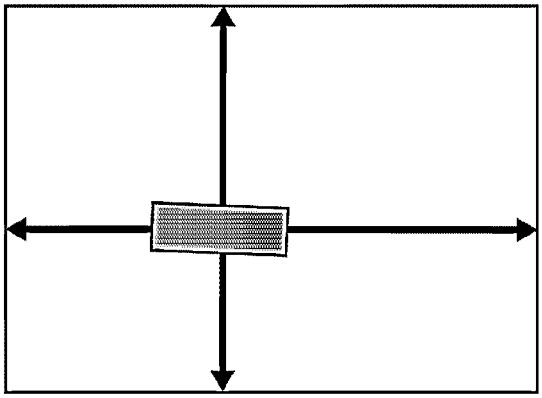
Figure 12C:
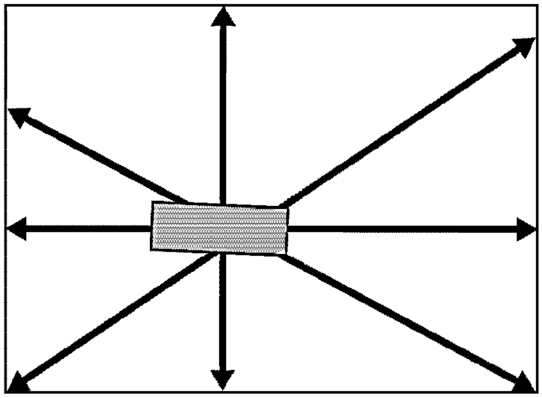

The search target line segments are the line segments that extend from the placement region as illustrated in FIGS. 12A, 12B, and 12C. FIG. 12A illustrates line segments as normal vectors with respect to the four sides of the placement region. Further, as illustrated in FIG. 12B, the line segments can be those that extend vertically or horizontally from the midpoints of the four sides of the placement region. Similarly, as illustrated in FIG. 12C, the line segments can be radial lines drawn from the center of the placement region. The search target component is acquired from one of these patterns.

In step S1102, the placement region expansion unit 208 selects one line segment from the acquired search target line segments, and the processing proceeds to step S1103.

In step S1103, the placement region expansion unit 208 generates a pixel value histogram of the pixels on the search target line segment, and the processing proceeds to step S1104.

In step S1104, the placement region expansion unit 208 determines whether an object is on the line segment.

If the density change of the pixel values is great, it is considered that some object exists on the line segment. In other words, it is determined that an object exists. If pixel values of specified color information such as blue (sky) or green (leaves) are continuously obtained, it can be determined that no object is included.

If it is determined that any object does not exist on the line segment (NO in step S1104), the processing proceeds to step S1105. If it is determined that an object exists on the line segment (YES in step S1104), the processing proceeds to step S1106.

In step S1105, the placement region expansion unit 208 determines the line segment which has been determined as having no object in step S1104 as an expandable line segment.

In step S1106, the placement region expansion unit 208 determines whether an undetermined line segment still exists in the search target line segments. If an undetermined line segment exists (YES in step S1106), the processing returns to step S1103. If the determination of all the search target line segments is finished (NO in step S1106), the expandable direction determination processing ends, and the processing proceeds to the placement region expansion processing in step S1002.

Since step S1002 is similar to the processing in step S503 in FIG. 5 described according to the first exemplary embodiment, its description is not repeated.

As described above, according to the present exemplary embodiment, since the expansion direction can be simply selected, processing speed can be increased and the work memory can be reduced.

According to the fourth exemplary embodiment, the expandable line segment is determined as not having an object throughout the line to the end of the image. According to a fifth exemplary embodiment, the line segment is sequentially scanned and the line segment from the pixel on the side of the placement region where the scanning is started to the pixel position where an object is determined is set as the expandable line segment. In this case, the background of the characters is expanded along the line segment to the pixel where the object is determined.

A number of methods used by the placement region expansion unit 208 in determining the expandable range have been described above. According to a sixth exemplary embodiment, the method for determining the expandable range is not limited so long as a region that does not include an object is detected by a combination of other image processing. For example, the placement region can be expanded by subjecting the whole image to color clustering, and expanding the placement region to the position of the largest color cluster area from the color clusters that contact the placement region of the processing object.

Further, a general technique for detecting a background from the image can also be used. When a background is detected, a portion that contacts the placement region out of the detected background is determined as the expandable range, and the placed region is expanded. Further, if any expandable region is not found on the periphery of the placement region, the placement region can be expanded in a direction set in advance.

Figure 13:
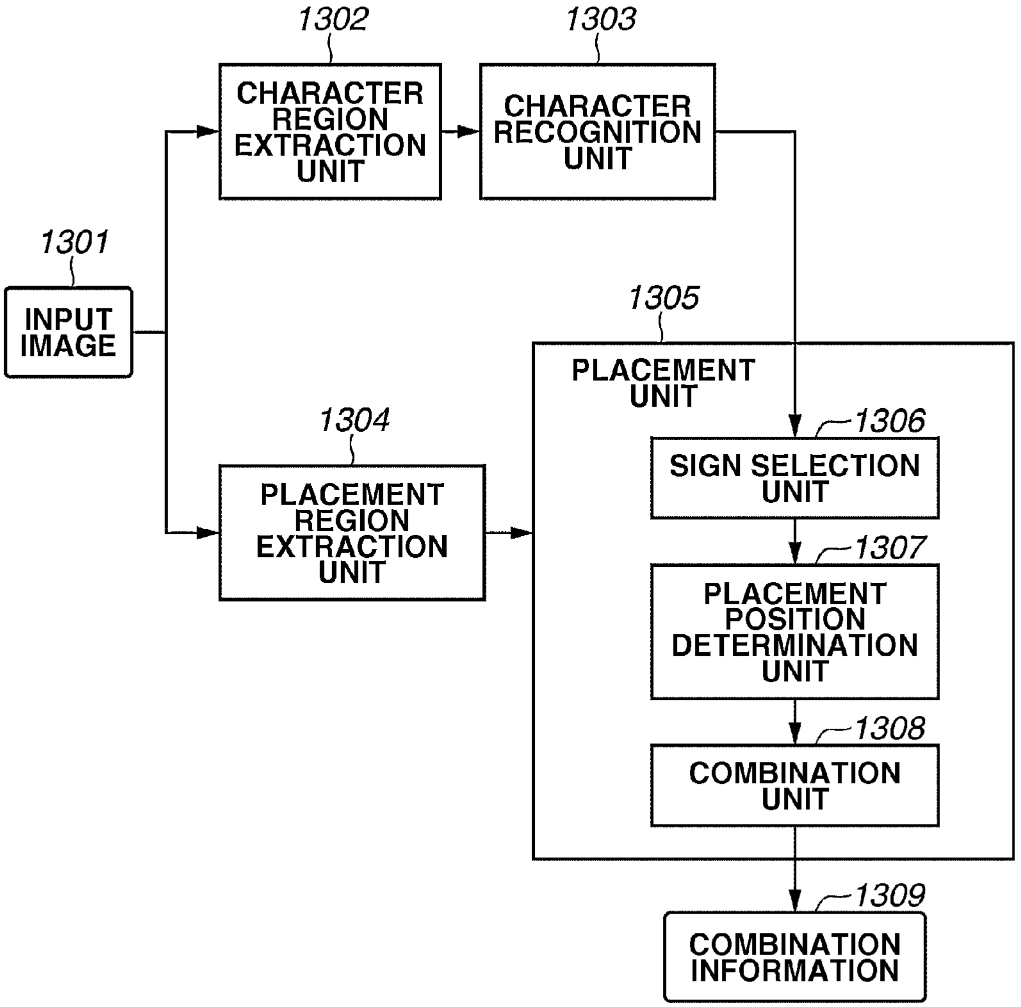
FIG. 13 is a function block diagram of the image processing apparatus according to a seventh exemplary embodiment.

FIG. 13 is a function block diagram of the image processing apparatus according to a seventh exemplary embodiment. According to the seventh exemplary embodiment, each function is described in detail after a brief description of each function block.

Figure 14A:
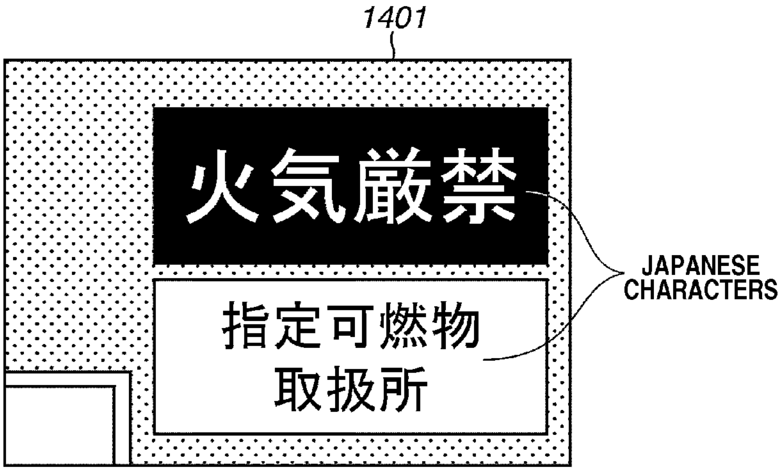
FIG. 14A illustrates an example of an input image.

An input image 1301 is input from the input device 110. An example of the input image 1301 is illustrated in FIG. 14A. An image 1401 in FIG. 14A includes two signboards as objects on the wall. The main body of the upper signboard is red and the characters are white. The main body of the lower signboard is white and the characters are black. Further, an object (a portion of a door) is seen at the bottom left corner of the image. The input image can be either a still image or a moving image previously stored in the storage device 106. Further, the input image can be a moving image acquired in real time and sequentially processed by the input device 110. According to the present exemplary embodiment, the image 1401 as a still image is used in describing the details of the subsequent processing.

According to the present exemplary embodiment, details of the subsequent processing will be described with reference to the image 1401.

A character region extraction unit 1302 extracts a region where the characters exist from the input image. The character region is, for example, a character region in a signboard. The character region can be extracted using a known technique described in the first exemplary embodiment.

Figure 14B:
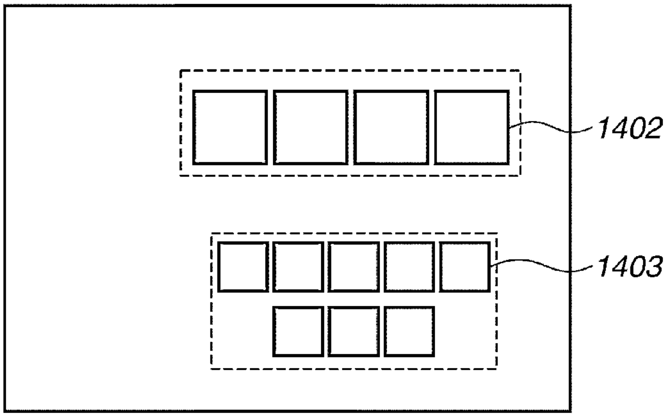
FIG. 14B illustrates an example of a character region.

Character regions 1402 and 1403 in FIG. 14B are the character regions extracted from the image 1401.

A character recognition unit 1303 performs character recognition of the character region extracted by the character region extraction unit 1302 and converts the recognized characters into character code. A publicly known character recognition technique can be used in the recognition. According to the present exemplary embodiment, information concerning the characters obtained from the character recognition processing, in other words, character code, is generated. Together with the character code, information of the character region obtained from the recognition processing, for example, coordinate information of a circumscribed rectangle of the character region as well as character color can be output as the character information. The present exemplary embodiment is based on a case where character code "火気厳禁" (Flammable—Keep Fire Away) is obtained from the character region 1402 and "指定可燃物 取扱所" (Designated Flammable Goods Handling Facility) are obtained from the character region 1403.

A placement region extraction unit 1304 extracts a character placement region from the input image. The placement region is a signboard main body, which is a background portion of the characters of the signboard. As is with the first exemplary embodiment, a publicly known technique used for recognizing license plates can be used for the extraction of the placement region.

Figure 14C:
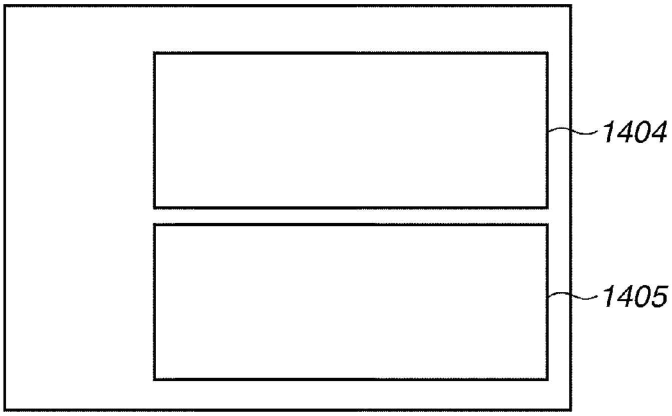
FIG. 14C illustrates an example of the placement region.

Regions 1404 and 1405 in FIG. 14C illustrate the placement regions extracted from the image 1401.

A placement unit 1305 converts the character code, which the character recognition unit 1303 acquired, into a sign understandable to the user and places it on the input image. The placement unit 1305 includes three processing units.

A sign selection unit 1306 selects a sign using a character code and a feature of the input image. A placement position determination unit 1307 determines the placement position of the sign on the input image. A combination unit 1308 generates combination information from the sign and the input image. Details of the placement unit 1305 will be described below.

Combination information 1309 is information obtained by the placement unit 1305 and is a combination of an input image and a sign. A display example of the combination information will be described below.

The processing is executed in units of the character regions extracted by the character region extraction unit 1302.

As described above, the placement unit 1305 includes the sign selection unit 1306, the placement position determination unit 1307, and the combination unit 1308. As illustrated in FIG. 13, the processing proceeds in the order of the sign selection unit 1306, the placement position determination unit 1307, and the combination unit 1308.

If the input image is a signboard of a danger sign or a signboard calling attention, the information needs to be conveyed with reliability. Thus, the sign selection unit 1306 selects a sign that matches the content according to a predetermined term included in the character code recognized by the character recognition unit 1303 or a color combination of the extracted character color and the color of the placement region.

More specifically, the sign selection unit 1306 calculates the warning level for each designated term and color combination, and selects a sign according to the obtained result.

According to the present exemplary embodiment, the sign selection unit 1306 selects one out of three signs: "prohibition", "caution", and "general information".

Figure 15A:
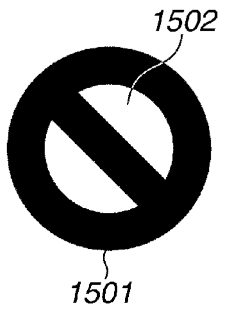
FIGS. 15A, 15B, and 15C illustrate an example of a sign selected by a sign selection unit.
Figure 15B:
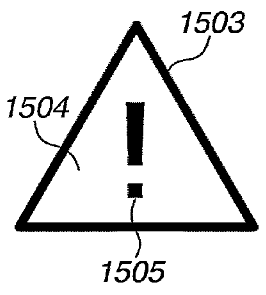
Figure 15C:
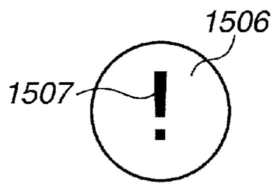

Examples of the signs are illustrated in FIGS. 15A, 15B, and 15C. FIG. 15A is a "prohibition" sign. A red circle and diagonal line 1501 is on a white background 1502. FIG. 15B is a "caution" sign. A black exclamation mark 1505 is on a yellow triangle 1504 with a black outline 1503. FIG. 15C is a "general information" sign. Any color combination other than those used for the signs in FIGS. 15A and 15B can be used. According to the present exemplary embodiment, a black exclamation mark 1507 is on a white background 1506.

Figure 16:
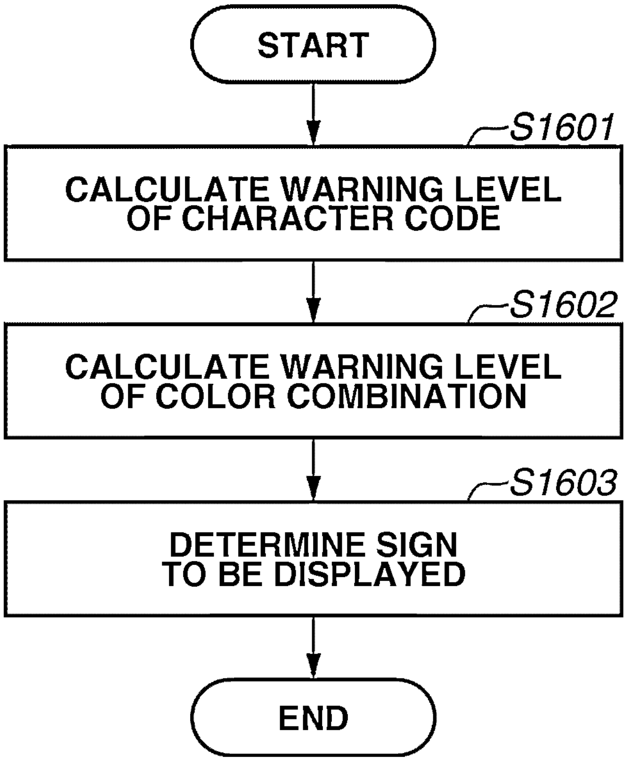
FIG. 16 is a flowchart illustrating processing procedures of the sign selection unit.

Next, processing procedures of the sign selection unit 1306 will be described with reference to a flowchart in FIG. 16. This flowchart is realized by the CPU 101 executing a control program.

In step S1601, the sign selection unit 1306 calculates a warning level of the characters from the character code recognized by the character recognition unit 1303, and the processing proceeds to step S1602. The warning levels are "prohibition", "caution", and "general information". The warning level "prohibition" is high, "caution" is medium, and "general information" is low.

The warning level is determined according to whether a predetermined term set in advance is included in the character code. The terms corresponding to the warning levels are given below:

Warning level "prohibition":

禁止 きんし 厳禁 だめ ダメ お断り おことわり いけない いけません 禁ず

Warning level "caution":

注意 ちゅうい 危険 きけん キケン 危 ない あぶない 警告

Warning level "general information":

Terms other than those classified in the warning levels "prohibition" and "caution"

According to the above-described determination standard, the warning level of the character code "火気厳禁" obtained from the character region 1402 is "prohibition" and the warning level of the character code "指定可燃物 取扱所" obtained from the character region 1403 is "general information". Further, if terms of different warning levels are included in the character code, a warning level of the higher one will be selected.

For example, if the character code to be determined are "あぶないからはいってはいけません", it includes "あぶない" which corresponds to the warning level "caution", and "いけません" which corresponds to the warning level "prohibition".

Since the warning level of a higher level is to be selected, the warning level of "あぶないからはいってはいけません" is determined as "prohibition".

Although the warning level is expressed in Japanese only according to the present exemplary embodiment, a synonymous foreign language can also be included.

In step S1602, the sign selection unit 1306 calculates the warning level of the color combination of the character region and the placement region, and the processing proceeds to step S1603.

The warning level of the color combination is presented in three levels 1, 2, and 3. The warning level is raised as the number is increased. The colors of the character region and the placement region are obtained by calculating an average of the color information of the pixels of the corresponding region. Further, color classification, such as red or blue, is determined using the position in the color space of the color information that has been calculated.

Details of the warning level regarding the color combination are illustrated in FIG. 17.

According to the determination standard in FIG. 17, the warning level of the combination of the character region 1402 with a white character color and the placement region 1404 which is red is 3.

Similarly, the warning level of the combination of the character region 1403 (character color is black) and the placement region 1404 (white) is 1. Further, if a character color or a placement region color in the same character region is partially different, a color with a higher warning level in the same character region is selected by execution of the warning level determination of each color combination.

In step S1603, the sign selection unit 1306 comprehensively determines the sign to be displayed based on the determination of the warning level of the characters calculated in advance and the warning level of the color combination.

According to the present exemplary embodiment, the type of the sign is selected based on the warning level of the characters, and the size of the sign is determined based on the warning level of the color combination.

More specifically, the following signs are selected based on the warning levels of the characters:

- The "prohibition" sign in FIG. 15A is selected if the warning level of the characters is "prohibition".
- The "caution" sign in FIG. 15B is selected if the warning level of the characters is "caution".
- The "general information" sign in FIG. 15C is selected if the warning level of the characters is "general information".

Further, if the color combination of the character code is a combination that calls attention, the information can be reliably presented to the user by enlarging the sign. Thus, the following sizes are selected based on the warning levels of the color combination.

- A small-size sign is used if the warning level of the color combination is 1.
- A medium-size sign is used if the warning level of the color combination is 2.
- A large-size sign is used if the warning level of the color combination is 3.

The size of the sign can also be a fixed size. Further, if an enlargement/reduction coefficient is set in advance, the size of the actual sign can be calculated based on the area of the corresponding character region and the coefficient of the sign size.

An example of a case where the sign size is fixed will be described.

The warning level of the character code "火気厳禁" in the character region 1402 in FIG. 14B is "prohibition" and the warning level of the color combination of the white characters in the character region 1402 and the red background of the placement region 1404 is 3. Thus, a large-size "prohibition" sign in FIG. 15A will be selected for the character region 1402.

Further, the warning level of the character code "指定可燃物 取扱所" obtained from the character region 1403 is "general information" and the warning level of the color combination of the black characters in the character region 1403 and the white background of the placement region 1405 is 1. Thus, a small-size "general information" sign in FIG. 15C will be selected for the character region 1403.

In this manner, a sign to be displayed is selected for each character region.

Next, the function of the placement position determination unit 1307 will be described.

The placement position determination unit 1307 encounters the following problems when it places the sign selected by the sign selection unit 1306. First, the sign needs to be placed near the corresponding character region so that the connection between the sign and the character region can be clearly understood. Next, the placement position determination unit 1307 has to consider objects other than the signboard. Such an object is hereinafter referred to as a foreground object and is often included in the input image.

If a danger sign or a sign for drawing attention is displayed over a foreground object, the user may have difficulty in viewing the sign. Further, since the positional relation between the signboard and the foreground object may have an important meaning, the original intention of the signboard may not be understood from the image if the placement position of the sign is not appropriate.

Thus, the placement position determination unit 1307 searches a region, in the input image, which is appropriate for the conveyance of the meaning of the signboard even if the sign is placed in that region. In other words, the placement position determination unit 1307 searches a region near the character region corresponding to the sign selected by the sign selection unit 1306 and does not include other foreground objects.

The presence/absence of a foreground object is determined by dividing the image into tiles of a predetermined size. If a foreground is included in the tiles, it is determined that the image includes a foreground. The position where the sign is to be set in the region that does not include a foreground object is determined by prioritizing the region that overlaps the character placement region in the signboard. If the area or the shape of the region that overlaps the character placement region is too small or inappropriate, the sign is set at a position closest from the character region out of the character placement region and does not include a foreground object.

Figure 18:
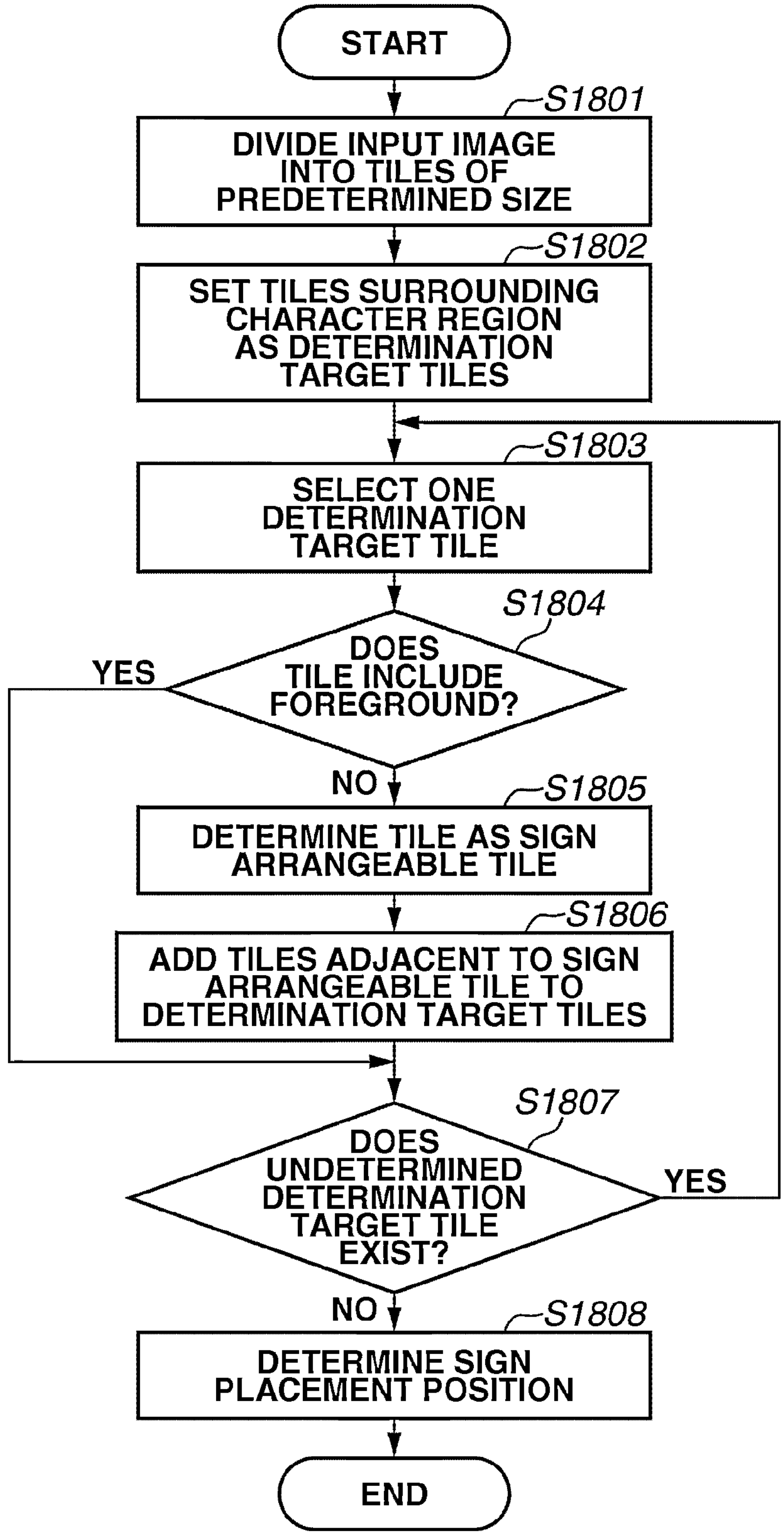
FIG. 18 is a flowchart illustrating processing procedures of a placement position determination unit.

FIG. 18 is a flowchart illustrating procedures of the placement position determination unit 1307.

Figures 19A, 19B, 19C, 19D:
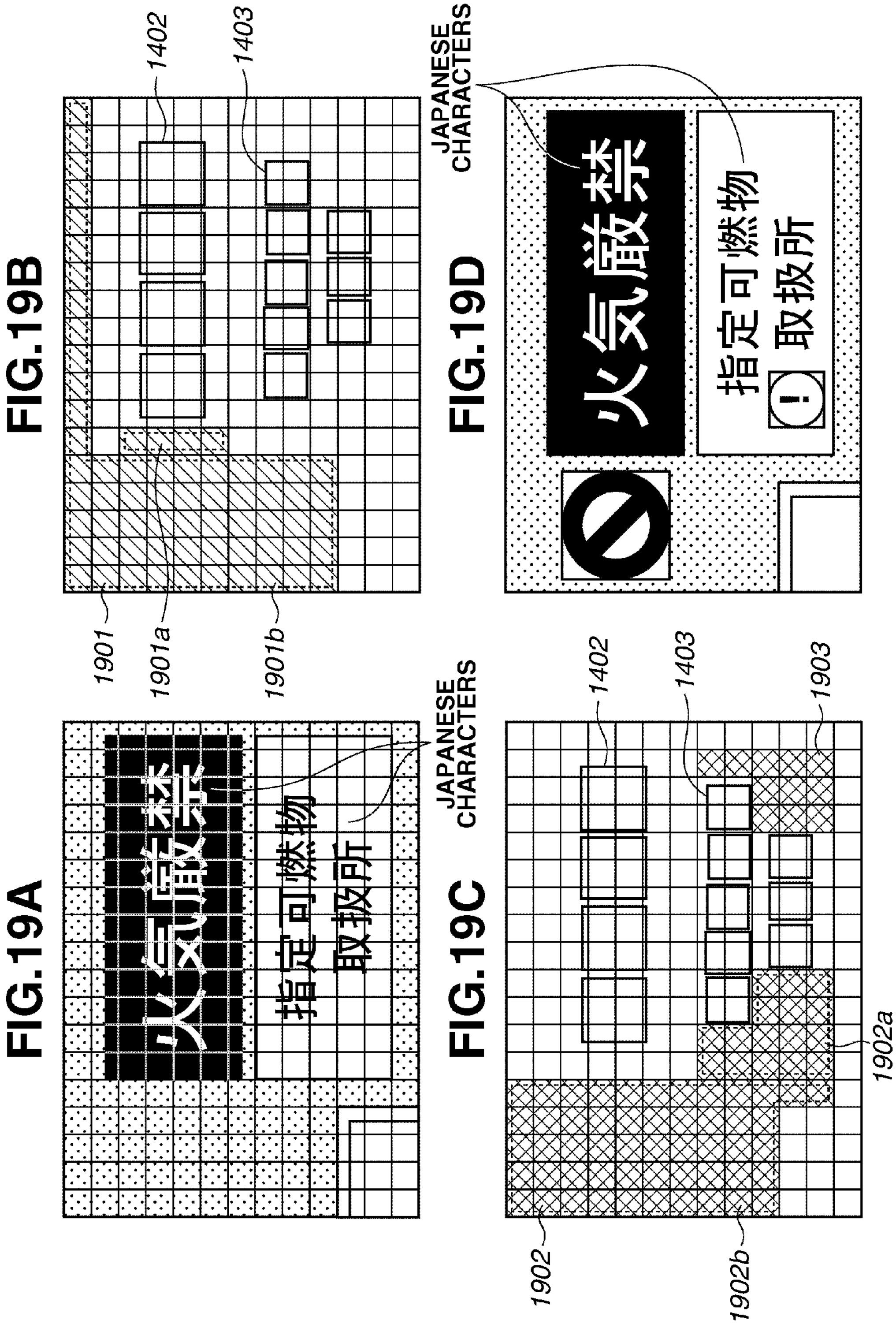
FIG. 19A illustrate an example of an input image divided into tiles.
FIGS. 19B and 19C illustrate examples of a sign-arrangeable position.
FIG. 19D illustrates an example of combination information.

In step S1801, the placement position determination unit 1307 divides the input image into tiles of a predetermined size, and the processing proceeds to step S1802. According to the present exemplary embodiment, although the predetermined tile size is 32×32 pixels, tiles of an arbitrary size can be used. FIG. 19A illustrates an example of the input image, illustrated in FIG. 14A, divided into tiles.

In step S1802, the placement position determination unit 1307 sets the tiles surrounding the character region of the processing object as the target tiles used for determining whether the sign can be placed, and the processing proceeds to step S1803.

If a plurality of character regions exists in the same image, step S1802 is useful since only the tiles surrounding the character regions will be used in the detection.

In step S1803, the placement position determination unit 1307 selects one tile from the determination target tiles, and the processing proceeds to step S1804. The tile to be processed in the subsequent processing is the tile selected from the determination target tiles.

In step S1804, the placement position determination unit 1307 determines whether a foreground is included in the tile.

If any foreground is not included in the tile (NO in step S1804), the processing proceeds to step S1805. If a foreground is included in the tile (YES in step S1804), the processing proceeds to step S1807.

The presence/absence of a foreground can be determined according to the methods below.

Generate a color histogram based on the color information of the tile. If the dispersion of the histogram is low, it is considered that any foreground is not included in the tile.

Acquire the color of the tile from the color information of the tile using a general color clustering method. If a unique color is acquired, it is considered that any foreground is not included in the tile.

Generate an edge image. If a strong edge component is not included in the tile, it is considered that any foreground is not included in the tile.

The sky portion of a scenic image does not affect the placement even if a sign is displayed over the sky. If the color information of the tile is mostly blue, it is considered that any foreground is not included in the tile.

Since the leaves and trees of a scenic image do not affect the placement even if a sign is displayed over them. If the color information of the tile is mostly green, it is considered that any foreground is not included in the tile.

The presence/absence of a foreground is determined by any or a combination of the above-described methods.

In step S1805, the placement position determination unit 1307 determines that the tile determined as not including a foreground in step S1804 is a sign arrangeable tile.

In step S1806, the placement position determination unit 1307 adds the tiles surrounding the sign arrangeable tile to the determination target tiles. More specifically, among the eight or four tiles surrounding the sign arrangeable tile, the tiles other than those that have already undergone the determination processing and the tiles already determined as the determination target tiles are added to the determination target tiles.

In step S1807, the placement position determination unit 1307 determines whether an undetermined tile is included in the determination target tiles. If an undetermined tile exists (YES in step S1807), the processing returns to step S1803. If the determination of all the determination target tiles is finished (NO in step S1807), the processing proceeds to step S1808.

A Tile group 1901 in FIG. 19B is a group of tiles determined as arrangeable of the sign of the character region 1402.

Further, each of tile groups 1902 and 1903 in FIG. 19C is a group of tiles determined as arrangeable of the sign of the character region 1403.

In step S1808, the placement position determination unit 1307 determines the tile in which the sign is to be placed out of the tiles without a foreground and are determined as arrangeable of the sign.

The tiles of the sign arrangeable tile group do not always exist as one group and may be partitioned with respect to the character region. Further, among the sign arrangeable tiles, it is desirable to designate the tiles that are closest to the characters. Thus, among the sign arrangeable tiles determined in step S1807, the optimum position for sign placement is further determined in step S1808.

The determination processing of the optimum position will be described with reference to FIG. 19C. The tile groups 1902 and 1903 are those determined as arrangeable of the character region 1403 in the above-described step S1807. First, the placement position determination unit 1307 determines whether the area or the shape of the tile groups 1902 (comprising 1902_a and 1902_b) or 1903 allows the placement of the sign that has been selected. In the case of FIG. 19C, the tile group is limited to the tile group 1902 (comprising 1902_a and 1902_b) considering the placement area of the sign.

Next, out of the tiles of the sign arrangeable tile group, the placement position determination unit 1307 determines the position in which the sign is to be placed. The user can easily understand that the sign is connected to the character region if the sign is located in the character placement region in the same signboard as the character region. Thus, among the tiles of the tile group 1902 (comprising 1902_a and 1902_b), which is sign arrangeable, in FIG. 19C, the placement position determination unit 1307 selects a tile group 1902_a, which overlaps the character placement region as the tiles for placing the sign.

In the case of the tile group 1901 in FIG. 19B, which is sign arrangeable, the tile group 1901_a, which overlaps the character placement region, does not have an area or shape appropriate for the placement of the sign. In this case, a tile group 1901_b, which is outside of the character placement region, is selected.

As described above, the tile group which is determined as sign arrangeable is the tile group 1901_b regarding the character region 1402, and the tile group which is determined as sign arrangeable is the tile group 1902_a regarding the character region 1403.

The position (coordinates position) where the sign is to be placed out of the tiles of the determined tile group is determined to the position closest to the character region that corresponds to the sign. For example, it is a position where a straight line connecting the character region and the sign is the shortest.

As described above, the position of the sign to be displayed is determined with respect to each character region.

Next, the combination unit 1308 will be described.

The combination unit 1308 combines the sign corresponding to each character region and selected by the sign selection unit 1306 and the placement position determined by the placement position determination unit 1307. When the combination is performed, the sign and the placement position may have similar colors. In such a case, since the visibility of the sign may be reduced, a background is set for the sign.

FIG. 19D illustrates an example of the combination information. The signs selected by the sign selection unit 1306 are placed at the positions determined by the placement position determination unit 1307 with respect to each character region.

According to the present exemplary embodiment, since the input image is described as a still image, the combination information in FIG. 19D is also a still image and is superposed on a still image. However, if the input image is a moving image, combination information acquired for each frame can be superposed on each frame. In this case, the user views the combination information as if it is a moving image. Further, combination information of a representative frame of the moving image frames may be continuously generated and displayed. In such a case, if the input image is a moving image acquired in real time, combination information of the input image can be generated by using augmented reality.

Regarding the image in FIG. 19D, even if the user is unable to read Japanese, the user can easily notice that the upper signboard includes prohibitive information and the lower signboard includes general information.

As described above, according to the present exemplary embodiment, a sign corresponding to the character region in the input image is selected and placed at an appropriate position. Thus, information of the character region can be reliably provided to the user.

Regarding the sign selection unit 1306 according to the seventh exemplary embodiment, the sign is selected after the determination of whether the information is warning information or other information.

However, the warning level "prohibition" is used for various levels. Thus, according to an eighth exemplary embodiment, the type of the designated term is subdivided and the number of the sign types that are displayed are increased.

More specifically, based on the terms that are classified as the warning level "prohibition", a table of signs corresponding to predetermined terms is prepared in advance. Thus, a sign can be selected from the table using extracted character code as a key.

FIG. 20A illustrates an example of a sign table of the warning level "prohibition". A sign 2001 is selected if a term with a meaning similar to "立ち入り禁止" (Staff only) is included. A sign 2002 is selected if a term with a meaning similar to "禁煙" (No Smoking) is included. A sign 2003 is selected if a term with a meaning similar to "撮影禁止" (Do not take photographs) is included. This table is merely an example and the table can be expanded by using a sign (not illustrated) informing of the general prohibition and the meaning of the sign.

According to the actual processing, if the warning level is "prohibition", the sign selection unit 1306 selects a sign referring to the table in FIG. 20A. Further, if the term is not included in the table in FIG. 20A, the sign in FIG. 15A is selected.

According to the eighth exemplary embodiment, the sign is selected based on a sign table including subdivided levels of the warning level "prohibition". According to a ninth exemplary embodiment, in addition to the warning level "prohibition", the warning levels "caution" and "general information" are also subdivided and the number of the displayed signs is increased.

FIG. 20B illustrates an example of a sign table of the warning levels "caution" and "general information". A sign 2004 corresponds to the warning level "caution" and is selected if a term with a meaning similar to "頭上注意" (Watch your head) is included. A sign 2005 corresponds to the warning level "caution" and is selected if a term with a meaning similar to "足元注意" (Watch your step) is included. A sign 2006 corresponds to the warning level "general information" and is selected if a term with a meaning similar to "トイレ" (Toilet, Restroom, or Wash room) is included. A sign 2007 corresponds to the warning level "general information" and is selected if the recognized character code is the name of a place. Whether character code is the name of a place is determined based on a database of place names prepared in advance.

This table is merely an example and the content of the table can be changed by using a sign (not illustrated) and its meaning.

When the processing is actually performed, the sign selection unit 1306 selects a sign by referring to the tables in FIGS. 20A and 20B. If a corresponding term is not found in the tables, as is performed in the seventh exemplary embodiment, a sign is selected from the warning levels in FIGS. 15A, 15B, and 15C.

According to the seventh, eighth, and ninth exemplary embodiments, the size of the input image and the object the user desires to see is large enough when they are displayed. However, the display device of a common digital camera is not large enough to be able to display the captured image at the same magnification. Thus, generally, a reduced image of the captured image is displayed on the display area.

In other words, even if a signboard whose information can be understood when the input image is displayed at the same magnification may be displayed at a size too small for visual checking when it is displayed on the display device. Thus, according to a tenth exemplary embodiment, a sign is displayed when the size of the characters on the display device is equal to or smaller than a predetermined size. Even if the letter of the language that a user can understand is written to the signboard, a user cannot overlook it when a size is too small.

In such a case, the placement unit 1305 additionally performs display character size determination processing. This processing is used for determining the size of the character region that corresponds to the predetermined term on the display device. As a result of the determination, if the character size is equal to or smaller than a predetermined size, the sign is placed.

Further, according to the seventh exemplary embodiment, in order to maintain good visibility of the sign, a background is added to the sign before it is placed. However, if the visibility of the combination of the color of the placement position and the color of the sign main body is good, the main body of the sign can be placed without the background.

Figure 21A:
FIG. 21A illustrates an example of a full display of an input image on a display device according to a tenth exemplary embodiment.

FIG. 21A illustrates a thumbnail of the input image displayed on the display device. A language (English) that a user can understand is written in the signboard. A user sets the language that a user can understand beforehand. It is possible to acquire it from the language setting of the device.

The objects of this image are the sea, a hill, a tree, and a signboard. If the input image is displayed at its original size, the characters of the signboard are large enough to be read. However, if the image is reduced as in FIG. 21A, the characters of the signboard are equal to or smaller than the predetermined size.

Figure 21B:
FIG. 21B illustrates an example of combination information according to the tenth exemplary embodiment.

FIG. 21B illustrates an example of the combination information. Since the sign "prohibition" in FIG. 15A is placed near the signboard, the user is able to understand that the signboard includes some information of prohibited matter.

In FIG. 21B, since the "prohibition" sign in FIG. 15A is in red and white and, further, since the sign is placed in the sky portion, the color of the placement position will be pale blue. Since the visibility of the sign is good with respect to this color combination, a background is not provided to this sign and only the main body of the sign is placed.

Figure 21C:
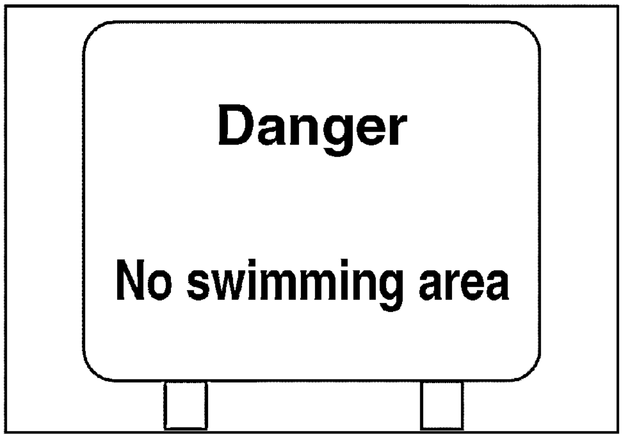
FIG. 21C illustrates an example of an enlarged display of the input image according to the tenth exemplary embodiment.

FIG. 21C illustrates an enlarged display of the signboard on the display device. Since the signboard is enlarged, it is understood that "Danger No swimming area" is written on the signboard. In this case, the size of the character region is equal to or greater than the predetermined size and the user can clearly read it. Accordingly, a sign is not placed.

As described above, according to the present exemplary embodiment, if the character size of a character region displayed on the display device is small, by selecting and placing a sign corresponding to the character region, information of the character region can be reliably presented to the user.

The present invention can also be realized by supplying a computer-readable storage medium storing software program code which realizes a function of the above-described embodiments to a control system or an apparatus. Thus, the object of the above-described embodiments can be also achieved when a computer (or a CPU or a micro processing unit (MPU)) of the system or the apparatus reads and executes the program code stored in such a computer-readable storage medium.

In this case, the program code itself read out from the storage medium realizes the functions described in the above-described embodiments. Thus, the storage medium that stores the program code constitutes the present invention.

A computer-readable storage medium storing the program code includes a flexible disk, a hard disk, an optical disk, a magneto-optical disk, a compact disc read-only memory (CD-ROM), a compact disc-recordable (CD-R), a non-volatile memory card, and a ROM.

A function of the above-described embodiments is realized not only when the computer executes the program code. For example, an operating system (OS) or the like, which runs on a computer, can execute a part or whole of the actual processing based on an instruction of the program code so that a function of the above-described embodiments can be achieved.

According to the exemplary embodiments of the present invention, a pattern corresponding to character code recognized and generated from a character region within an image can be placed in a region with small feature change in the image with enhanced visibility.

According to the exemplary embodiments of the present invention, since the region where the characters in the image are placed is expanded, information obtained from the character code which has been recognized and generated from the characters in the image can be placed in a region with small feature change in the image with enhanced visibility.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-173023 filed Aug. 8, 2011, No. 2011-245794 filed Nov. 9, 2011, and No. 2012-148457 filed Jul. 2, 2012, which are hereby incorporated by reference herein in their entirety.

What is claimed is:

1. An image processing apparatus comprising:
one or more processors; and
memory,
wherein the one or more processors are configured to:
perform character recognition of a character region where characters exist in a digital image to generate character code;
extract a placement region where the characters are placed from the digital image;
detect a region of the digital image where a feature change in the digital image is small;
determine an expansion direction in which the placement region is to be expanded, based on a position of the detected region on a periphery of the placement region; and
expand the placement region in the determined expansion direction, and place data obtained from the character code in the expanded placement region.

2. The image processing apparatus according to claim 1, wherein a sign obtained from the character code is placed in a blank region in the placement region in priority to the detected region.

3. The image processing apparatus according to claim 1, wherein the expansion direction is determined based on a distribution of detected regions.

4. The image processing apparatus according to claim 1, wherein whether a feature change of the digital image is small is determined in order from a region surrounding the placement region.

5. The image processing apparatus according to claim 1, wherein a sign obtained from the character code is placed in the detected region.

6. The image processing apparatus according to claim 1, wherein the one or more processors are further configured to convert the generated character code; and
wherein a pattern corresponding to the converted character code is placed in the detected region.

7. The image processing apparatus according to claim 6, wherein the generated character code is converted into a new character code such that an area for placing a pattern corresponding to the generated character code before conversion is different from an area for placing a pattern corresponding to the character code after conversion.

8. The image processing apparatus according to claim 6, wherein the generated character code is converted into a new character code based on a translation of the generated character code to another language.

9. The image processing apparatus according to claim 6, wherein, if the generated character code is code of kanji character, the code of kanji character is converted into code of hiragana character.

10. The image processing apparatus according to claim 6, wherein the generated character code is converted into character code of a plain term with an equal meaning.

11. The image processing apparatus according to claim 6, wherein the generated character code is converted into a sign having a same meaning.

12. The image processing apparatus according to claim 1, wherein, if a character size of the characters subjected to the character recognition is smaller than a predetermined lower limit character size, a pattern corresponding to the character code with a character size greater than or equal to the lower limit character size is placed.

13. The image processing apparatus according to claim 1, wherein a region of the digital image where a color change in the digital image is small is detected.

14. The image processing apparatus according to claim 1, wherein a region of the digital image where an edge component in the digital image is small is detected.

15. The image processing apparatus according to claim 1, wherein the digital image and the data obtained from the character code are combined.

16. The image processing apparatus according to claim 1, wherein the region of the digital image where the feature change in the digital image is small is detected by limiting a range of detection to the periphery of the placement region.

17. The image processing apparatus according to claim 1, wherein the expansion direction in which the placement region is to be expanded is determined based on a distribution of the detected region on the periphery of the placement region.

18. The image processing apparatus according to claim 1, wherein a sign of a type obtained based on an obtained characteristic color and a color of the placement region is placed.

19. The image processing apparatus according to claim 1, wherein a sign of a size based on an obtained characteristic color and a color of the placement region is placed.

20. An image processing method comprising:
performing, at a computing device, character recognition of a character region where characters exist in a digital image to generate character code;
extracting a placement region where the characters are placed from the digital image;
detecting a region of the digital image where a feature change in the digital image is small;

determining an expansion direction in which the placement region is to be expanded, based on a position of the detected region on a periphery of the placement region; and expanding the placement region in the determined expansion direction, and placing data obtained from the character code in the expanded placement region.

21. A non-transitory computer-readable storage medium storing a program comprising:

performing character recognition of a character region where characters exist in a digital image to generate character code;

extracting a placement region where the characters are placed from the digital image;

detecting a region of the digital image where a feature change in the digital image is small;

determining an expansion direction in which the placement region is to be expanded, based on position of the detected region on a periphery of the placement region; and expanding the placement region in the determined direction, and placing data obtained from the character code in the expanded placement region.

22. An image processing apparatus comprising:

one or more processors; and memory, wherein the one or more processors are configured to: perform character recognition of a character region where characters exist in a digital image to generate character code;

extract a placement region where the characters are placed from the digital image;

determine an expansion direction in which the placement region is to be expanded, based on strength of luminance gradient on a periphery of the placement region; and expand the placement region in the determined expansion direction, and place data obtained from the character code in the expanded placement region.

23. An image processing method comprising:

performing, at a computing device, character recognition of a character region where characters exist in a digital image to generate character code;

extracting a placement region where the characters are placed from the digital image;

determining an expansion direction in which the placement region is to be expanded, based on strength of luminance gradient on a periphery of the placement region; and p1 expanding the placement region in the determined expansion direction, and place data obtained from the character code in the expanded placement region.

24. A non-transitory computer-readable storage medium storing instructions that when executed perform a process, the process comprising:

performing character recognition of a character region where characters exist in a digital image to generate character code;

extract a placement region where the characters are placed from the digital image;

determine an expansion direction in which the placement region is to be expanded, based on strength of luminance gradient on a periphery of the placement region; and expand the placement region in the determined expansion direction, and place data obtained from the character code in the expanded placement region.

* * * * *